US008854410B2

(12) United States Patent
Minabe et al.

(10) Patent No.: US 8,854,410 B2
(45) Date of Patent: Oct. 7, 2014

(54) EXPOSURE DEVICE AND IMAGE FORMING APPARATUS

(75) Inventors: Jiro Minabe, Kanagawa (JP); Keishi Shimizu, Kanagawa (JP); Mihoko Wakui, Kanagawa (JP); Yasuhiro Ogasawara, Kanagawa (JP); Kazuhiro Hayashi, Kanagawa (JP); Akira Tateishi, Kanagawa (JP); Shin Yasuda, Kanagawa (JP); Motoki Taniguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 685 days.

(21) Appl. No.: 13/214,889

(22) Filed: Aug. 22, 2011

(65) Prior Publication Data

US 2012/0236280 A1 Sep. 20, 2012

(30) Foreign Application Priority Data

Mar. 17, 2011 (JP) ................................ 2011-059685

(51) Int. Cl.

| | |
|---|---|
| ***B41J 15/14*** | (2006.01) |
| ***B41J 27/00*** | (2006.01) |
| ***G02B 5/32*** | (2006.01) |
| ***G03G 15/043*** | (2006.01) |
| ***G03G 15/04*** | (2006.01) |

(52) U.S. Cl.

CPC ...... *G03G 15/04054* (2013.01); *G03G 15/0435* (2013.01)

USPC .............................. 347/244; 347/258; 359/15

(58) Field of Classification Search

USPC ......... 347/238, 240, 241, 244, 251–254, 256, 347/258; 359/9, 12, 14–28

See application file for complete search history.

(56) References Cited

U.S. PATENT DOCUMENTS

2010/0238531 A1* 9/2010 Yasuda et al. .................. 359/15

FOREIGN PATENT DOCUMENTS

| | | |
|---|---|---|
| JP | A-2007-237576 | 9/2007 |
| JP | A-2000-330058 | 11/2008 |

* cited by examiner

*Primary Examiner* — Hai C Pham

(74) *Attorney, Agent, or Firm* — Oliff PLC

(57) ABSTRACT

An exposure device includes at least one light emitting element that emits light in a normal direction of the substrate; at least one hologram element that is recorded on a recording layer arranged on the substrate to diffract light emitted from the light emitting element and condense the diffracted light on a condensing point on a normal line of the light emitting element; and at least one light inhibiting part that is arranged on a straight line that connects the light emitting element and the condensing point such that the light diffracted by the hologram element passes through the outside of the light inhibiting part and condenses at the condensing point, to inhibit transmission of zeroth-order light that goes straight toward the condensing point from the light emitting element without being diffracted by the hologram element.

20 Claims, 15 Drawing Sheets

EXPOSURE DEVICE AND IMAGE FORMING APPARATUS

CROSS-REFERENCE TO RELATED APPLICATIONS

This application is based on and claims priority under 35 USC 119 from Japanese Patent Application No. 2011-059685 filed Mar. 17, 2011.

BACKGROUND

Technical Field

The present invention relates to an exposure device and an image forming apparatus.

SUMMARY

According to an aspect of the invention, there is provided an exposure device including at least one light emitting element that is arranged on a substrate to emit light in a normal direction of the substrate; at least one hologram element that is recorded on a recording layer arranged on the substrate so as to form a set with each of the light emitting elements and that diffracts light emitted from the light emitting element, and condenses the diffracted light on a condensing point that is present on a normal line of the light emitting element and on a face to be exposed; and at least one light inhibiting part that is provided the set and is arranged on a straight line that connects the light emitting element and the condensing point such that the light diffracted by the hologram element passes through the outside of the light inhibiting part and condenses at the condensing point, to inhibit transmission of zeroth-order light that goes straight toward the condensing point from the light emitting element without being diffracted by the hologram element.

BRIEF DESCRIPTION OF THE DRAWINGS

Exemplary embodiments of the present invention will be described in detail based on the following figures, wherein.

DETAILED DESCRIPTION

Hereinafter, an example of an exemplary embodiment of the invention will be described in detail with reference to the drawings.

<Image Forming Apparatus>

Figure 1:
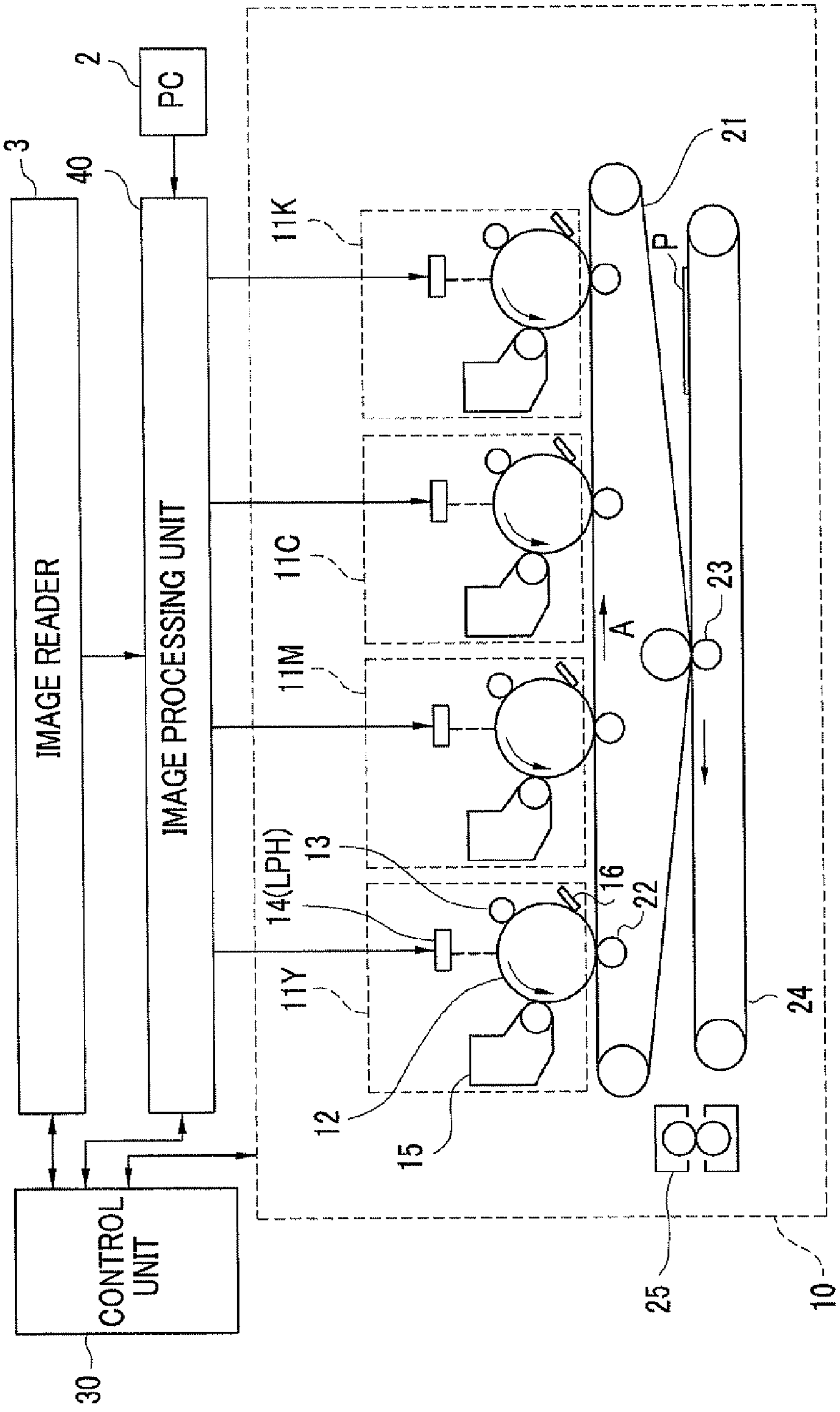
FIG. 1 is a schematic view showing an example of the configuration of an image forming apparatus related to an exemplary embodiment of the invention.

FIG. 1 is a schematic view showing an example of the configuration of an image forming apparatus related to the exemplary embodiment of the invention. This apparatus is an image forming apparatus that forms an image by an electrophotographic system, and mounts an exposure device (an LED print head, abbreviated as an "LPH") of an LED printer using a light emitting diode (LED) as a light source. The LED print head has the advantage that mechanical driving is unnecessary.

This image forming apparatus is a so-called tandem digital color printer, and includes an image forming processing unit 10 serving as an image forming part that performs image formation in correspondence with image data of respective colors, a control unit 30 that controls the operation of the image forming apparatus, and an image processing unit 40 that is connected to an image reader 3 and external devices, such as a personal computer (PC) 2, and performs predetermined image processing on the image data received from these devices.

The image forming processing unit 10 is equipped with four image forming units 11Y, 11M, 11C, and 11K that are arranged in parallel at regular intervals. The image forming units 11Y, 11M, 11C, and 11K form yellow (Y), magenta (M), cyan (C), and black (K) toner images, respectively. In addition, the image forming units 11Y, 11M, 11C, and 11K are appropriately and collectively referred to as the "image forming unit 11".

Each image forming unit 11 is equipped with a photoreceptor drum 12 serving as an image carrier that forms an electrostatic latent image to hold a toner image, a charger 13 that charges the surface of the photoreceptor drum 12 uniformly with predetermined potential, a LED print head (LPH) 14 serving as an exposing device that exposes the photoreceptor drum 12 charged by the charger 13, a developing device 15 that develops the electrostatic latent image obtained by the LPH 14, and a cleaner 16 that cleans the surface of the photoreceptor drum 12 after transfer.

The related-art LPH is composed of an LED array and a rod lens array. A gradient index rod lens, such as Selfoc (registered trademark), has been used for the rod lens array. The light emitted from each LED is condensed by the rod lens, and an erect equal magnification image is formed on the photoreceptor drum. The image forming apparatus related to the present exemplary embodiment is equipped with an LPH using a "hologram element" instead of the "rod lens".

The LPH 14 is a long print head with almost the same length as the length of the photoreceptor drum 12 in the direction of the axis thereof. Plural LEDs are arranged in an array (row) along the length direction in the LPH 14. The LPH 14 is arranged around the photoreceptor drum 12 such that the length direction thereof is directed to the axis direction of the photoreceptor drum 12.

The LPH 14 of this exemplary embodiment is arranged to separate from the surface of the photoreceptor drum 12 by an operating distance. The LPH 14 of this exemplary embodiment has a long operating distance compared to a related-art LPH. Additionally, the LPH 14 of this exemplary embodiment emits light a direction (the normal direction of the LED substrate 58 that will be described below) perpendicular to the LPH 14 similarly to the related-art LPH. Accordingly, similarly to the related-art LPH, the LPH 14 of this exemplary embodiment is arranged such that a light emission plane of the LPH 14 faces the photoreceptor drum 12. For this reason, the occupancy width of the photoreceptor drum 12 in the circumferential direction thereof is small, and congestion around the photoreceptor drum 12 is eased.

Additionally, the image forming processing unit 10 is equipped with an intermediate transfer belt 21 onto which respective color toner images formed on the photoreceptor drums of the respective image forming units 11 are multi-transferred, a primary transfer roller 22 that sequentially transfers (primarily transfers) the respective color toner images of the respective image forming units 11 to the intermediate transfer belt 21, a secondary transfer roller 23 that collectively transfers (secondarily transfers) the superimposed toner images transferred onto the intermediate transfer belt 21 to the paper P that is a recording medium, and a fixing device 25 that fixes the secondarily transferred images on the paper P.

Next, the operation of the above image forming apparatus will be described.

First, the image forming processing unit 10 performs an image formation operation on the basis of control signals, such as a synchronizing signal supplied from the control unit 30. In such a case, the image data input from the image reader 3 or PC 2 is subjected to image processing by the image processing unit 40, and is supplied to each image forming unit 11 via an interface.

For example, in the image forming unit 11Y for yellow, the surface of the photoreceptor drum 12 uniformly charged with predetermined potential by the charger 13 is exposed by the LPH 14 that emits light on the basis of the image data obtained from the image processing unit 40, and an electrostatic latent image is formed on the photoreceptor drum 12. That is, the surface of the photoreceptor drum 12 is fast scanned as each LED of the LPH 14 emits light on the basis of image data, and the surface of the photoreceptor drum is slowly scanned as the photoreceptor drum 12 rotates, whereby an electrostatic latent image is formed on the photoreceptor drum 12. The formed electrostatic latent image is developed by the developing device 15, and a yellow toner image is formed on the photoreceptor drum 12. Similarly, in the image forming units 11M, 11C, and 11K, magenta, cyan, and black toner images are formed, respectively.

The respective color toner images formed in the respective image forming units 11 are electrostatically attracted sequentially and transferred (primarily transferred) by the primary transfer roller 22, onto the intermediate transfer belt 21 that operates to rotate in the direction of an arrow A of FIG. 1. The superimposed toner images are formed on the intermediate transfer belt 21. The superimposed toner images are conveyed to a region (secondary transfer unit) in which the secondary transfer roller 23 is disposed with the movement of the intermediate transfer belt 21. When the superimposed toner images are conveyed to the secondary transfer unit, the paper P is conveyed to the secondary transfer unit at the timing when a toner image is conveyed to the secondary transfer unit.

Then, the superimposed toner images are collectively and electrostatically transferred (secondarily transferred) onto the conveyed paper P by a transfer electric field formed by the secondary transfer roller 23 in the secondary transfer unit. The paper P on which the superimposed toner images have been electrostatically transferred is peeled off from the intermediate transfer belt 21, and is conveyed to the fixing device 25 by the conveying belt 24. The unfixed toner image on the paper P conveyed to the fixing device 25 is fixed on the paper P in response to the fixing processing caused by heat and pressure by the fixing device 25. Then, the paper P on which the fixing image has been formed is ejected to a paper ejection tray (not shown) provided at an ejection unit of the image forming apparatus.

First Exemplary Embodiment

LED Print Head

Figure 2:
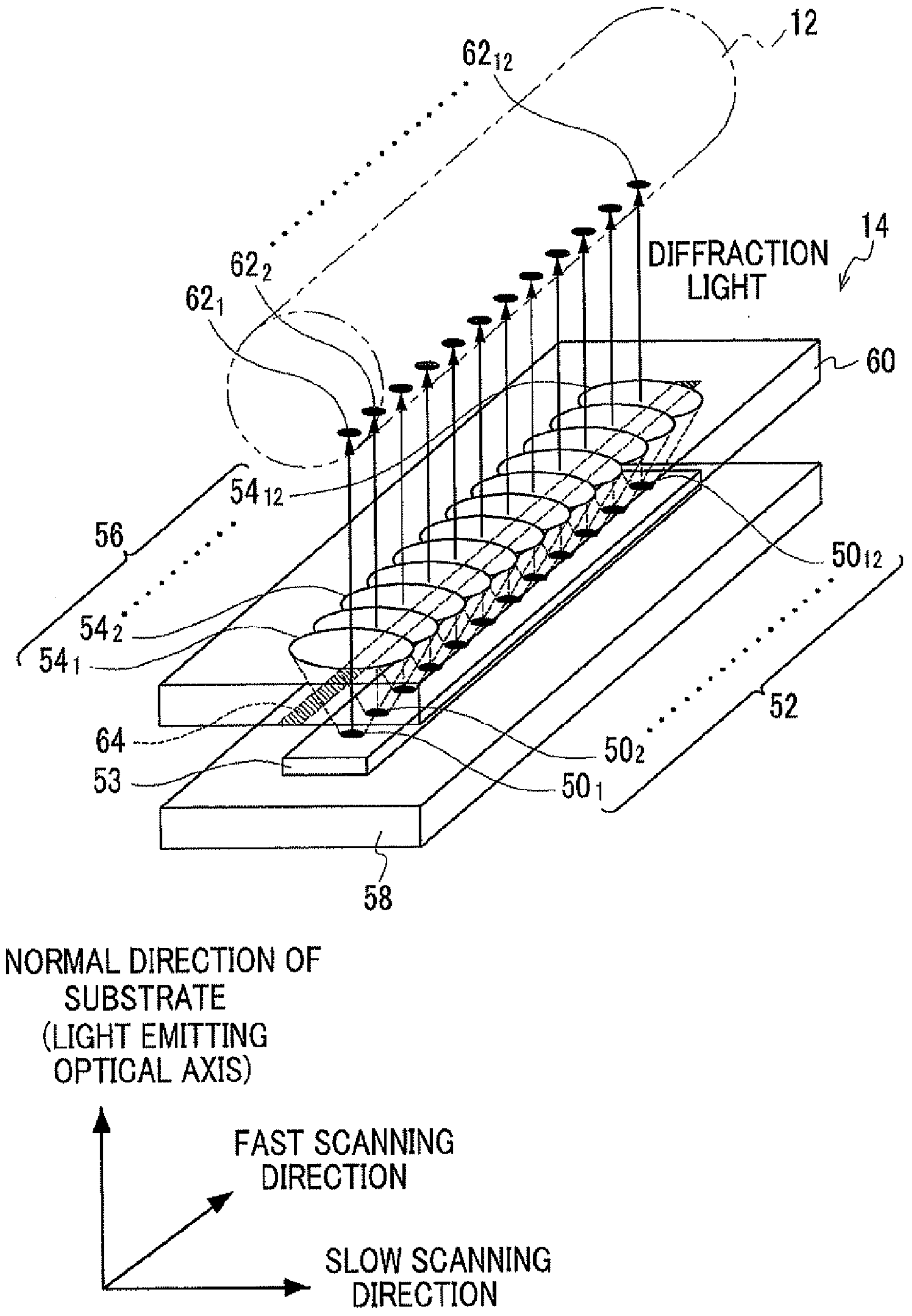
FIG. 2 is a schematic perspective view showing an example of the configuration of an LED print head related to a first exemplary embodiment of the invention.
Figure 3A:
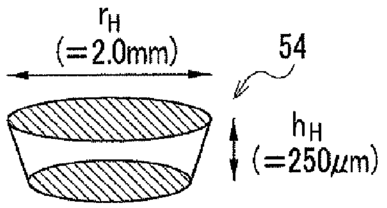
FIG. 3A is a perspective view showing the schematic shape of a hologram element.
Figure 3B:
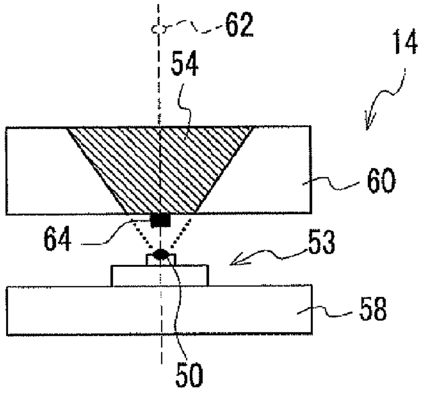
FIG. 3B is a cross-sectional view along the slow scanning direction of an LED print head.
Figure 3C:
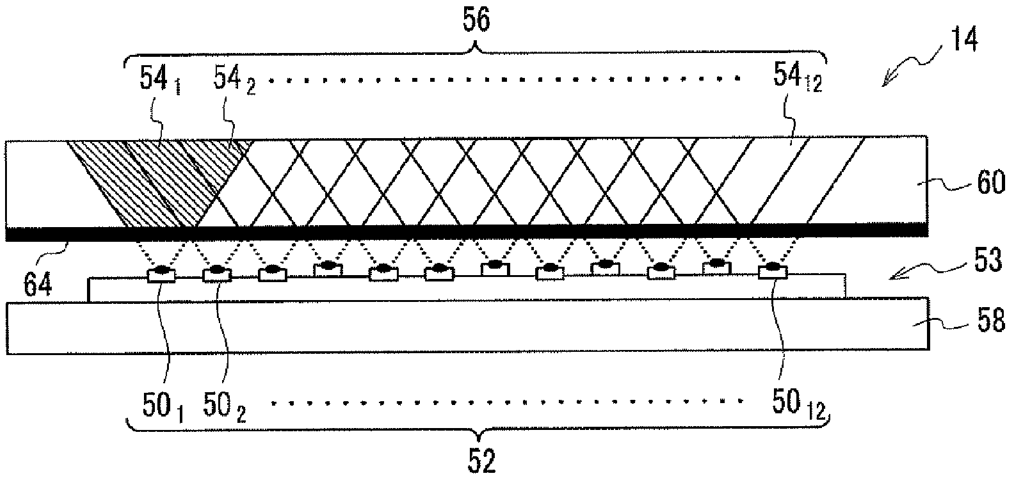
FIG. 3C is a cross-sectional view along the fast scanning direction of the LED print head.

FIG. 2 is a schematic perspective view showing an example of the configuration of an LED print head serving as an exposure device related to a first exemplary embodiment of the invention. FIG. 3A is a perspective view showing the schematic shape of a hologram element. FIG. 3B is a cross-sectional view of the LED print head in a slow scanning direction. FIG. 3C is a cross-sectional view of the LED print head along a fast scanning direction.

As shown in FIG. 2, the LED print head (LPH) 14 is equipped with an LED array 52 equipped with plural LEDs 50, and a hologram element array 56 equipped with plural hologram elements 54 provided so as to correspond to the plural LEDs 50, respectively.

In the example shown in FIG. 2, the LED array 52 is equipped with twelve LEDS $\mathbf{50}_1$ to $\mathbf{50}_{12}$, and the hologram element array 56 is equipped with twelve hologram elements $\mathbf{54}_1$ to $\mathbf{54}_{12}$. In addition, when the LEDs and the hologram elements do not need to be distinguished, respectively, the LEDs $\mathbf{50}_1$ to $\mathbf{50}_{12}$ are generically referred to as the "LEDs 50", and the hologram elements $\mathbf{54}_1$ to $\mathbf{54}_{12}$ are generically referred to as the "hologram elements 54".

Each of the plural LEDs 50 is arranged on an LED chip 53. The LED chip 53 on which the plural LEDs 50 are arranged is mounted on a long LED substrate 58 together with a driving circuit (not shown) that drives the LEDs 50, respectively. The LED chip 53 is arranged on the LED substrate 58 such that the plural LEDs 50 are positioned and aligned in the fast scanning direction. Thereby, the LEDs 50 are respectively arranged along a direction parallel to the axis direction of the photoreceptor drum 12.

The arrangement direction of the LEDs 50 is the "fast scanning direction". Additionally, the LEDs 50 are respectively arranged such that the interval (light emitting point pitch) in the fast scanning direction between two mutually adjacent LEDs 50 (light emitting points) becomes a regular interval. Additionally, although slow scanning is performed by the rotation of the photoreceptor drum 12, the direction orthogonal to the "fast scanning direction" is shown as the "slow scanning direction". Additionally, in the following, the positions where the LEDs 50 are arranged are appropriately referred to as the "light emitting points".

The plural LEDs 50 are respectively arranged on the LED chip 53 with their light emitting faces directed to the hologram elements 54 side so as to emit light to the corresponding hologram elements 54 side. The "light emitting optical axis" of the LEDs 50 is an optical axis of light emitted in a direction (normal direction) orthogonal to the LED substrate 58 from the LEDs 50. The surface of the LED substrate 58 where the LEDs 50 or the driving circuit are mounted is a "principal plane". The normal direction of this principal plane is the normal direction of the LED substrate 58. Accordingly, the "light emitting optical axis" of the LEDs 50 is turned to the normal direction of the LED substrate 58. As shown in the drawing, the light emitting optical axis is orthogonal to the fast scanning direction and the slow scanning direction, respectively.

In addition, in FIG. 2, the LPH 14 composed of one LED chip 53 on which several LEDs 50 are arranged in one row is only schematically shown. In an actual image forming apparatus, thousands of LEDs 50 are arranged by arranging hundreds of LED chips 53 according to the resolution in the fast scanning direction. For example, in order to obtain the resolution of 1200 spots per inch in an image forming apparatus capable of performing printing up to the width of A3, 14848 LEDs 50 are arranged at intervals of 21 μm on the LED substrate 58.

Additionally, the plural LED chips 53 may be one-dimensionally arranged, or may be divided into two or more rows and two-dimensionally arranged. For example, when arranged in zigzags, the plural LED chips 53 are arranged in one row so as to be aligned in the fast scanning direction, and arranged in two rows in the slow scanning direction so as to shift by a predetermined interval. Even if the plural LEDs 50 are divided into units of plural LED chips 53, the plural LEDs 50 are respectively arranged such that the interval between two mutually adjacent LEDs 50 in the fast scanning direction becomes a substantially regular interval.

As the LED chip 53, an SLED chip in which plural self-scanning type LEDs (SLED: Self-scanning LED) are arranged may be used. The SLED chip performs ON/OFF of a switch by two signal lines, makes respective SLEDs emit light selectively, and makes a data line common. By using this SLED chip, the number of necessary wiring lines on a substrate may be made small.

A hologram recording layer 60 is arranged on the LED substrate 58. The hologram element array 56 is formed within the hologram recording layer 60. The hologram recording layer 60 is held by a holding member (not shown) at a position separated from the LED chip 53 by a predetermined height.

A light inhibiting part 64, which inhibits transmission of zeroth-order light components that are not diffracted by the hologram elements 54, is arranged between the LEDs 50 and the hologram recording layer 60. Here, when a spot 62 that will be described below is used as a condensing point, a zeroth-order light component goes straight toward the condensing point from a light emitting point without being diffracted by a hologram element 54. Accordingly, the light inhibiting part 64 is arranged on an optical path of the zeroth-order light component, i.e., a straight line that connects the light emitting point and the condensing point.

The light inhibiting part 64 may be arranged on the straight line that connects the light emitting element and the condensing point. For example, the light inhibiting part may be arranged on either the light incidence side or light emission side of the hologram recording layer 60. In this exemplary embodiment, the light inhibiting part 64 is arranged so as to be adjacent to the light incidence plane side of the hologram recording layer 60. When the light inhibiting part is arranged so as to be adjacent to the hologram recording layer 60, positioning and attachment of the light inhibiting part 64 become easy. As will be described below, the light inhibiting part 64 may be arranged so as to be adjacent to the light emission plane side of the hologram recording layer 60 (refer to FIG. 6).

Additionally, a separating layer, such as air and transparent resin, which is made of a material transparent in light emitted from the LEDs 50, may be arranged between the LEDs 50 and the hologram recording layer 60 (or between the LEDs 50 and the light inhibiting part 64).

Plural hologram elements 54 corresponding to the plural LEDs 50 are formed along the fast scanning direction in the hologram recording layer 60. Each of the hologram elements 54 is recorded so as to emit diffraction light in the normal direction of the LED substrate 58. The hologram elements 54 are respectively arranged such that the interval (interval between central points) between two mutually adjacent hologram elements 54 in the fast scanning direction becomes almost the same interval as the interval between the LEDs 50 in the fast scanning direction. That is, the large-diameter hologram elements 54 are multiplexing-recorded such that two mutually adjacent hologram elements 54 overlap each other. Additionally, the plural hologram elements 54 may have mutually different shapes, respectively.

The hologram recording layer 60 is made of polymeric materials capable of recording and holding a hologram permanently. As such polymeric materials, a so-called photo-polymer may be used. The photo-polymer records a hologram using a refractive-index change caused by polymerizing a photopolymerizable monomer.

The light inhibiting part 64 is not particularly limited if the light inhibiting part is a member having the function of inhibiting transmission of zeroth-order light components. As the light inhibiting part 64, an optical element that intercepts or attenuates incident zeroth-order light components is used. For example, as the light inhibiting part 64, a light absorber that absorbs incident light, a reflector that reflects incident light, a diffuser that diffuses incident light in plural directions, a deflecting element that deflects (refract) incident light in a predetermined direction, a diffraction grating that diffracts incident light in a predetermined direction, and the like are used. Specific examples of the respective optical elements will be described below.

As can be seen by referring to FIGS. 3B and 3C, in this exemplary embodiment, one belt-shaped light inhibiting part 64 that extends in the fast scanning direction is arranged so as to cover the central portion of a light incidence plane of the hologram recording layer 60 in the width direction thereof. The belt-shaped light inhibiting part 64 inhibits zeroth-order light components, which are not diffracted by corresponding hologram elements 54, among light components emitted from the plural LEDs 50, respectively, from being transmitted through the hologram recording layer 60. In other words, the light inhibiting part 64 is arranged so as to cover only a portion of the light incidence plane of the hologram recording layer 60 such that the light diffracted by a hologram element 54 passes through the outside of the light inhibiting part 64 and enters the hologram element 54.

In addition, although not shown, the LPH 14 is held by a holding member, such as a housing or a holder, and is attached to a predetermined position within the image forming unit 11 shown in FIG. 1 such that the diffraction light generated by a hologram element 54 is emitted in the direction of the photoreceptor drum 12. Since the LPH 14 of this exemplary embodiment is arranged so as to face the photoreceptor drum 12 similarly to the related-art LPH, the LPH may be attached as a replacement part of the related-art LPH. If a photoreceptor may be arranged in direction perpendicular to an exposure device, the alignment between the photoreceptor and the exposure device may be facilitated, and an occupied region around the photoreceptor may be made small. This becomes favorable to a low-cost small image forming apparatus.

The LPH 14 may be configured by an adjusting part, such as an adjustable screw (not shown), so as to move in the direction of an optical axis of the diffraction light. The imaging position (focal plane) by the hologram element 54 is adjusted by an adjusting part so as to be located on the surface of the photoreceptor drum 12. Additionally, a protective layer may be formed on the hologram recording layer 60 from a cover glass, transparent resin, or the like. Adhesion of dust is prevented by the protective layer.

Additionally, the hologram recording layer 60 may be housed within a container made of glass, resin, or the like. For example, the hologram recording layer 60 may be made of a hologram recording material enclosed in the container. The hologram recording layer 60 housed within the container is easily handled. Additionally, the container functions also as the protective layer. When the hologram recording layer 60 is housed in the container, the light inhibiting part 64 is formed as a portion of the container.

(Operation of LED Print Head)

When an LED 50 is made to emit light, the light (incoherent light) emitted from the LED 50 passes through the optical path of the diffused light that is diffused to the diameter of a hologram from a light emitting point. The light emission of the LED 50 leads to almost the same situation as that where the hologram element 54 is irradiated with reference light.

As shown in FIG. 2, in the LPH 14 equipped with the LED array 52 and the hologram element array 56, the light components emitted from the twelve LEDs $\mathbf{50}_1$ to $\mathbf{50}_{12}$, respectively, have zeroth-order light components intercepted or attenuated by the light inhibiting part 64, and enter any of the corresponding hologram elements $\mathbf{54}_1$ to $\mathbf{54}_{12}$. The hologram elements $\mathbf{54}_1$ to $\mathbf{54}_{12}$ diffract the light components that have entered, thereby generating diffraction light components. Each diffraction light beam generated in each of the hologram elements $\mathbf{54}_1$ to $\mathbf{54}_{12}$ is emitted in the normal direction of the LED substrate 58.

The photoreceptor drum 12 is arranged so as to face the LPH 14. The respective diffraction light components that have been emitted in the normal direction of the LED substrate 58 are condensed in the direction of the photoreceptor drum 12, thereby forming an image on the surface of the photoreceptor drum 12 arranged at a focal plane several centimeters ahead. That is, each of the plural hologram elements 54 functions as an optical member that diffracts and condenses the light emitted from the corresponding LED 50, and forms an image on the surface of the photoreceptor drum 12.

Minute spots $\mathbf{62}_1$ to $\mathbf{62}_{12}$ caused by the respective diffraction light components are formed on the surface of the photoreceptor drum 12 so as to be arranged in one row in the fast scanning direction. In other words, the photoreceptor drum 12 is fast scanned by the LPH 14. In addition, when the spots do not need to be distinguished, respectively, the spots $\mathbf{62}_1$ to $\mathbf{62}_{12}$ are generically referred to as "spots 62". For example, when 14848 LEDs 50 are arranged at intervals of 21 μm as described above, 14848 spots 62 are formed on the surface 12A of the photoreceptor drum 12 so as to be arranged in one row in the fast scanning direction at intervals of 21 μm.

Generally, in an LPH using LEDs that emit incoherent light, coherence degrades, spot blurring (so-called chromatic aberration) occurs, and it is not easy to form minute spots. In contrast, in the LPH 14 of the present exemplary embodiment, the angle-of-incidence selectivity and wavelength selectivity of the hologram elements 54 are high. Therefore, minute spots are easily obtained, and a long operating distance is obtained compared to a related-art LPH using a rod lens.

Additionally, when the unnecessary light that is emitted from each LED 50 and transmitted without being diffracted by a hologram element 54 reaches the photoreceptor 12, background noise increases, and contrast degrades. On the other hand, in the LPH 14 of this exemplary embodiment, zeroth-order light components are intercepted or attenuated by the light inhibiting part 64, and the unnecessary light that reaches the photoreceptor 12 is reduced.

As described above, in this exemplary embodiment, signal light is reproduced with high precision and clear minute spots 62 (condensing points) of an outline are formed, due to the condensing performance and long operating distance of the hologram elements 54 to the minute spots, and the reduction of the unnecessary light by the light inhibiting part 64.

(Shape of Hologram Element)

As shown in FIGS. 3A to 3C, each of the hologram elements 54 is a volume hologram generally referred to as a thick hologram element. As described above, the hologram elements have high angle-of-incidence selectivity and wavelength selectivity, controls the emitting angle (diffraction angle) of diffraction light with high precision to form clear minute spots of an outline. As the thickness of a hologram is greater, the precision of the diffraction angle becomes higher.

Each of the hologram elements 54 has the surface side of the hologram recording layer 60 as a bottom face, and is formed in the shape of a truncated cone that is condensed toward the LED 50 side. Although the truncated-cone-shaped hologram element is described in this example, the shape of the hologram elements is not limited to this. For example, the shapes of a cone, an elliptical cone, an elliptical frustum, and the like may be used. The diameter of the truncated-cone-shaped hologram elements 54 becomes largest at the bottom face thereof. The diameter of this circular bottom face is defined as the "hologram diameter $r_H$". In addition, the "hologram thickness $h_H$" is the thickness of the hologram elements 54.

Plural hologram elements 54 corresponding to the plural LEDs 50 are multiplexing-recorded in the hologram recording layer 60 so as to be aligned in the fast scanning direction. Each of the hologram elements 54 has a larger "hologram diameter $r_H$" than the interval between the LEDs 50 in the fast scanning direction. For example, the interval between the LEDs 50 in the fast scanning direction is 30 μm, the hologram diameter $r_H$ is 2 mm, and the hologram thickness $h_H$ is 250 μm. Accordingly, two mutually adjacent hologram elements 54 are formed so as to overlap each other greatly.

(Method for Fabricating LED Print Head)

Figure 4:
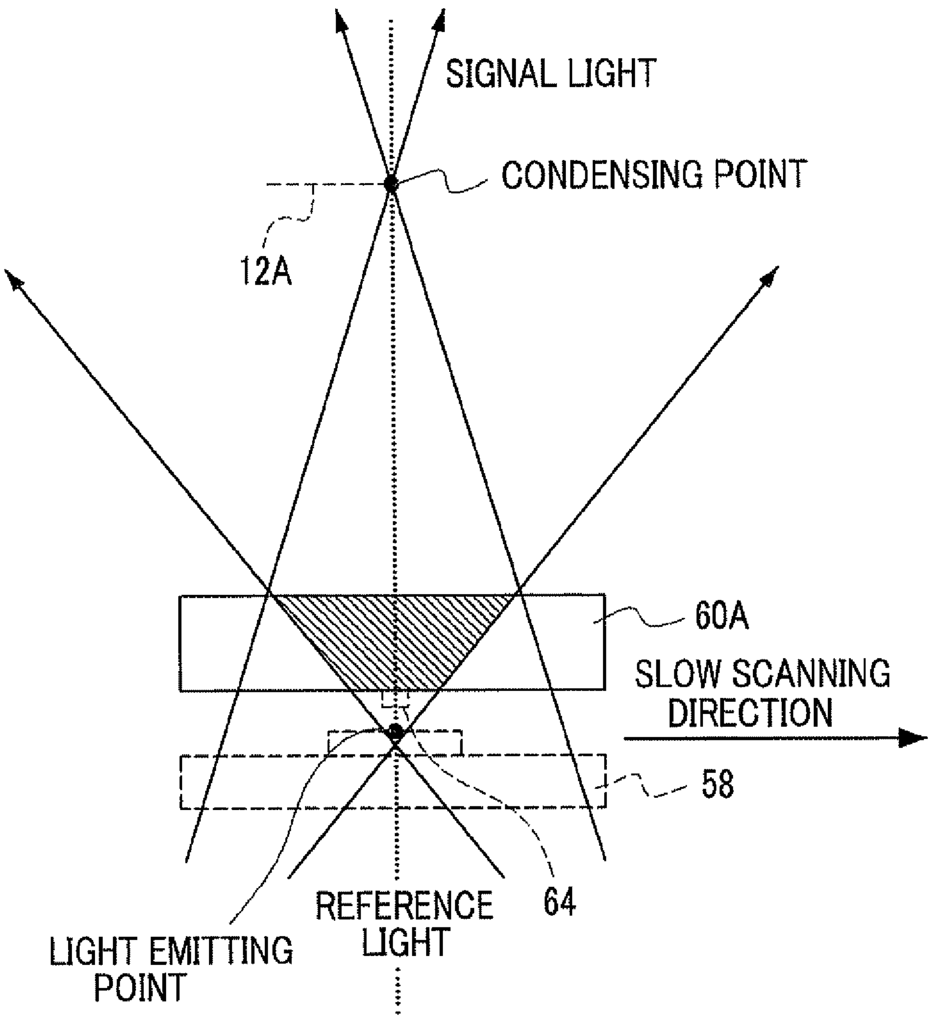
FIG. 4 is a typical cross-sectional view showing that a hologram is recorded in a first exemplary embodiment.

Next, a method for fabricating an LED print head will be described. FIG. 4 is a typical cross-sectional view showing that a hologram is recorded in the first exemplary embodiment, i.e., that a hologram element 54 is formed in the hologram recording layer 60A before a hologram is recorded. Illustration of the photoreceptor drum 12 is omitted, and only the surface 12A that is an imaging surface is shown.

As shown in FIG. 4, coherent light that passes through an optical path of diffraction light that forms a condensing point on the surface 12A is irradiated to the hologram recording layer 60A as signal light. Simultaneously, when passing through the hologram recording layer 60A, coherent light that passes through an optical path of diffused light that is diffused from the light emitting point to a desired hologram diameter $r_H$ is irradiated to the hologram recording layer 60A as reference light. A laser light source, such as a semiconductor laser, is used for the irradiation of the coherent light.

The signal light and the reference light are irradiated from the same side (side where the LED substrate 58 is arranged) as the hologram recording layer 60A. Additionally, the signal light and the reference light are coaxially irradiated using the same lens such that the optical axis of the signal light and the optical axis of the reference light coincide with each other. As shown in FIG. 4, when the diffraction light caused by the hologram element 54 is emitted in the normal direction of the LED substrate 58, the condensing point exists on a normal line of the LED substrate 58 from the light emitting point.

In the case of the "coaxial recording type" in which the signal light and the reference light are coaxially irradiated, the straight line (shown by a dotted line) that passes through the light emitting point and the condensing point becomes parallel to the optical axis of the diffraction light. Accordingly, in the case of the "coaxial recording type", it is also possible to form the signal light and the reference light via the same lens. In this case, the structure of a recording device is simplified, and a low cost of an exposure device is achieved. As compared to a "two-lightwave recording type" in which the signal light and the reference light are made to intersect each other at an angle therebetween, the spread (numerical aperture NA) of the reference light that records the hologram element 54 can be increased, and the use efficiency of the light that enters the hologram element 54 is improved.

An interference fringe (intensity distribution) obtained by the interference between the signal light and the reference light is recorded in the thickness direction of the hologram recording layer 60A. Here, plural transmissive hologram elements 54 corresponding to plural LEDs 50 are recorded. The hologram element array 56 is formed in the hologram recording layer 60. Each of the hologram elements 54 is a volume hologram in which the intensity distribution of an interference fringe has been recorded in the planar direction and the thickness direction.

Next, the belt-shaped light inhibiting part 64 is provided on the surface on the light incidence side of the hologram recording layer 60 so as to cover the central portion of the light incidence plane in the width direction thereof. For example, when the light inhibiting part 64 is composed of an optical absorber, such as black resin, the black resin is applied to a portion of the light incidence plane, and thereby, the light inhibiting part 64 is formed. The LPH 14 shown in FIGS. 2 and 3A to 3C is fabricated by attaching the hologram recording layer 60 in which the light inhibiting part 64 is provided onto the LED substrate 58 on which the LED array 52 is mounted.

Additionally, when the light inhibiting part 64 is formed as a portion of a container, holograms may be recorded by phase conjugation recording after the hologram recording layer 60A is attached onto the LED substrate 58 on which the LED array 52 is mounted. Since holograms are recorded after the hologram recording layer 60A is attached, the distance between the LEDs 50 and the corresponding hologram element 54 is secured, and the high positional precision between the LEDs 50 and the corresponding hologram elements 54 becomes unnecessary. In the phase conjugation recording, the signal light and reference light that pass through the same optical paths as above are irradiated from the side where the LED substrate 58 or the like is not arranged, i.e., from the surface side (the upper side of the drawing) of the hologram recording layer 60A. Even in this case, the hologram recording layer 60 in which the transmissive hologram elements 54 are formed is similarly obtained.

Moreover, as described above, the light inhibiting part 64 may be formed before holograms are formed. The position where the light inhibiting part 64 is arranged may be selected according to the side where the signal light and the reference light are irradiated, and the type of the light inhibiting part 64 so as to prevent formation of unnecessary holograms caused by the light influenced in the light inhibiting part 64. For example, when attenuation of light is small in a region after transmission through the light inhibiting part 64 as in the case where the light inhibiting part 64 is a diffuser, a deflecting element, a diffraction grating, or the like, the light inhibiting part 64 may be arranged opposite the side where recording light is irradiated. Additionally, when attenuation of light is large in a region after transmission through the light inhibiting part 64 as in the case where the light inhibiting part 64 is an absorber, a reflector, or the like, the light inhibiting part 64 may be arranged on the side where recording light is irradiated. Thereby, hologram recording that is unnecessary for formation of the minute spots 62 can be prevented, and an exposure device with high condensing intensity and low background noise is obtained.

(Exposure Method Using LED Print Head)

Figure 5:
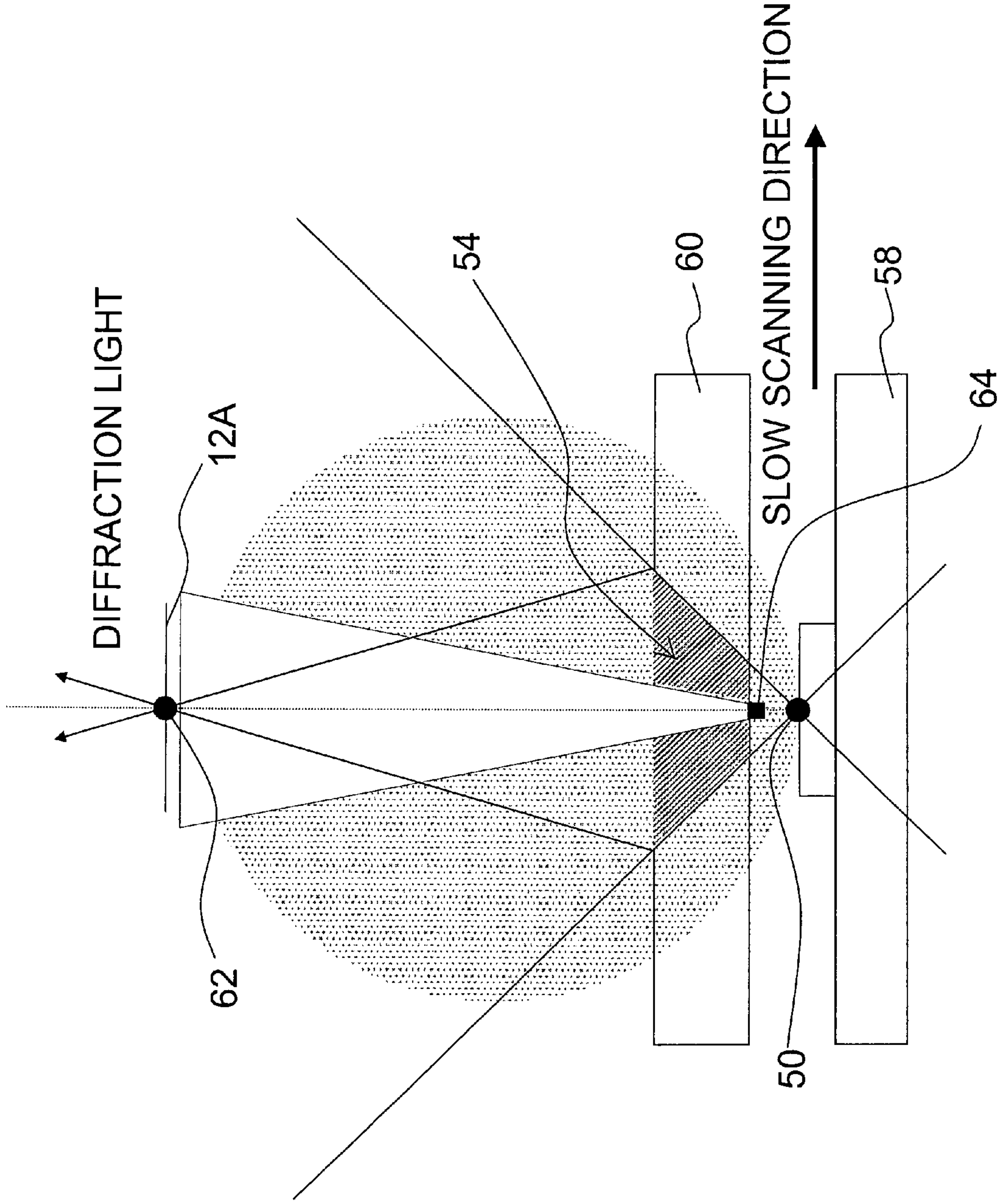
FIG. 5 is a typical cross-sectional view showing that a hologram is reproduced in a first exemplary embodiment.

Next, an exposure method using the LED print head will be described. FIG. 5 is a typical cross-sectional view showing that a hologram is reproduced, i.e., that diffraction light is taken out from a hologram element 54 recorded on the hologram recording layer 60. As shown in FIG. 5, when an LED 50 that is an incoherent light source is made to emit light, the light emitted from the LED 50 diverges and is diffused. This phenomenon is referred to as "Lambertian light distribution". The same phenomenon is observed also in an electroluminescent device (EL) that is similarly an incoherent light source.

When an LED 50 is made to emit light, a portion of the light emitted from the LED 50 passes through an optical path of reference light. Most of the light that passes through the optical path of the reference light passes through the outside of the light inhibiting part 64, and enters the hologram recording layer 60. Thereby, the same situation as that in which reference light (hereinafter referred to as "reference light for reproduction") for reading is irradiated to a hologram element 54 recorded on the hologram recording layer is obtained. The same light as the signal light is reproduced from the hologram element 54 as shown by a solid line by the irradiation of the reference light for reproduction shown by a dotted line, and is emitted as diffraction light. The emitted diffraction light condenses, and is formed as an image on the surface 12A of the photoreceptor drum 12 at an operating distance of several centimeters. A spot 62 is formed on the surface 12A.

On the other hand, a zeroth-order light component that goes straight toward the condensing point from the light emitting point is included in the light that passes through the optical path of the reference light without being diffracting by the hologram element 54. A portion of the light that passes through the optical path of the reference light is intercepted or attenuated by the light inhibiting part 64 arranged on an optical path of the zeroth-order light component. Accordingly, the zeroth-order light component that arrives at the surface 12A of the photoreceptor drum 12 is reduced. In addition, as for the "zeroth-order light that is not diffracted by the hologram element 54", the light that passes through the outside of the light inhibiting part 64 and enters the hologram recording layer 60 in the light that passes along the optical path of the reference light is referred to as "light diffracted by the hologram element 54". The light that enters the hologram recording layer 60 and the light that is diffracted by the hologram element 54 and emitted from the hologram recording layer 60 are included in the "light diffracted by the hologram element 54."

That is, the light inhibiting part 64 intercepts or attenuates at least one light of the light that enters the hologram element 54 and the light that is diffracted and emitted from the hologram element 54.

(Modification of Light Inhibiting Part)

Next, a modification of the light inhibiting part will be described. First, as for the position on the optical axis where the light inhibiting part 64 is arranged, the light inhibiting part may be arranged at any position on the straight line that connects the light emitting point and the condensing point as above. The position on the optical axis where the light inhibiting part 64 is arranged may be within a range between the hologram recording layer 60 and the LEDs 50. When the light inhibiting part is arranged within this range, there is an advantage that the diffraction light from the hologram element 54 is not inhibited. The position on the optical axis that additionally arranges the light inhibiting part 64 is good also within a range from a condensing-point-side surface of the hologram recording layer 60 to an LED-side surface thereof. When the light inhibiting part is arranged within this range, there is an advantage that a new supporting member for arranging the light inhibiting part 64 is not further required.

Figure 6:
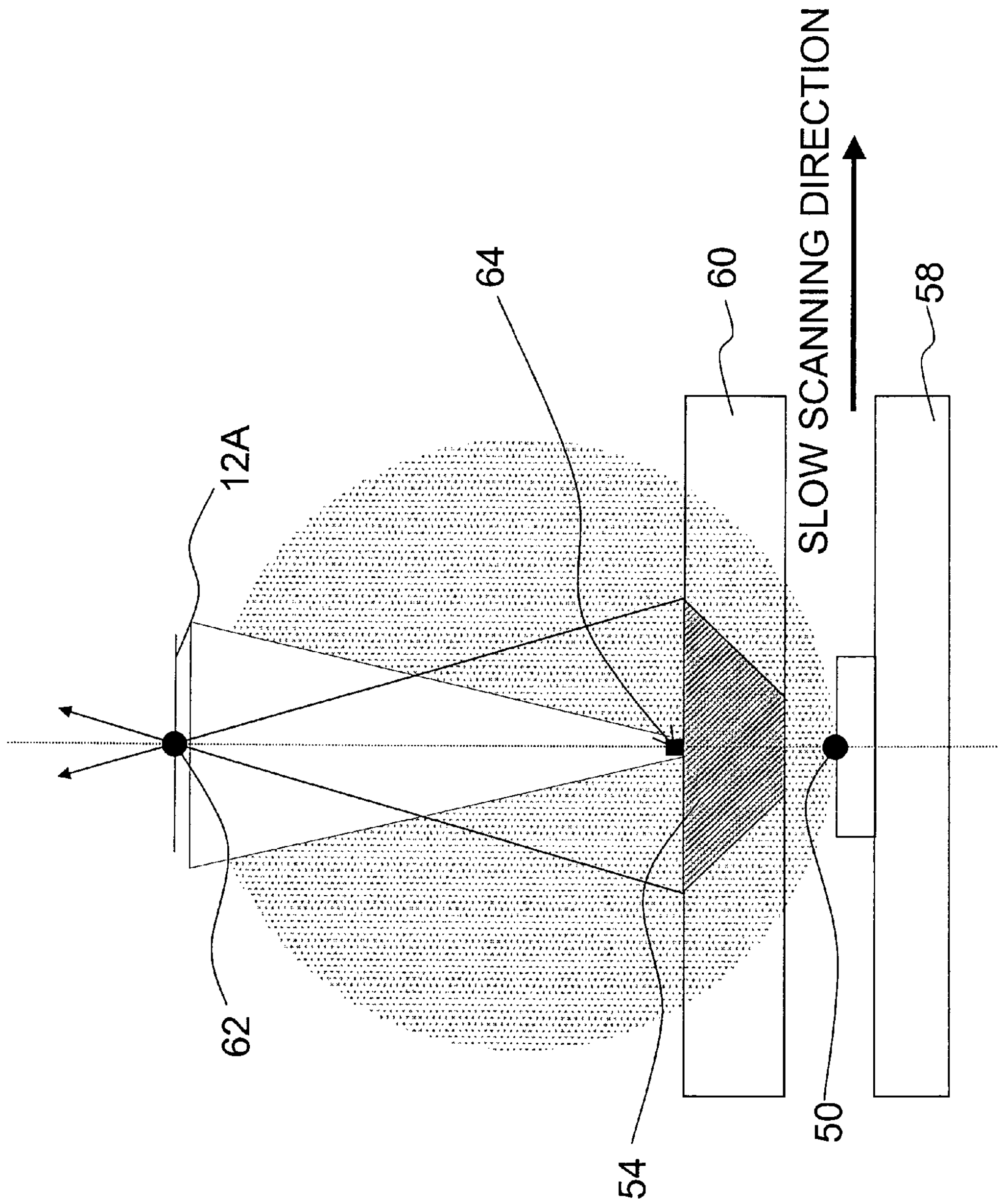
FIG. 6 is a typical cross-sectional view showing another position on an optical axis where a light inhibiting part is arranged.

When the light inhibiting part is arranged so as to be adjacent to the hologram recording layer 60, positioning and attachment of the light inhibiting part 64 become easy. For example, as shown in FIG. 6, the light inhibiting part 64 may be arranged so as to be adjacent to the light emission plane side of the hologram recording layer 60. In addition, the straight line that passes through the light emitting point and the condensing point is shown by a dotted line. Although most of the light that is emitted from an LED 50 and passes through an optical path of reference light also in the example shown in FIG. 6 passes through the outside of the light inhibiting part 64 and is diffracted by the hologram element 54, a portion of the light (zeroth-order light component) that passes through the optical path of the reference light is intercepted or decreased by the light inhibiting part 64.

Additionally, the position within a plane where the light inhibiting part 64 is arranged, i.e., the shape and area of the light inhibiting part 64 as seen in plan view are determined such that the reproduction reference light that passes through the outside of the light inhibiting part 64 increases, and the formation of the light inhibiting part 64 becomes easy. For example, in the example shown in FIG. 2, the example in which one belt-shaped light inhibiting part 64 that extends in the fast scanning direction is arranged is described. However, a point-like light inhibiting part 64 is arranged at each of the plural hologram elements 54. In addition, in the form in which one belt-shaped light inhibiting part 64 is arranged, positioning of the light inhibiting part in the fast scanning direction becomes easy, and the unnecessary light that arrives at a face to be exposed may be expected to be reliably reduced as compared to a case where the light inhibiting part is arranged in a discrete manner in the fast scanning direction.

Additionally, in the example shown in FIG. 2, the width of the belt-shaped light inhibiting part 64 is determined according to the distance from the LED 50 to the light inhibiting part 64 and the distance from the light inhibiting part 64 to the condensing point, on the basis of the design of the shading width of the condensing point in the slow scanning direction. For example, when the shading width of the condensing point in the slow scanning direction is set to 5 to 10 mm, the width of the belt-shaped light inhibiting part 64 is determined as 500 μm to 1 mm when the distance from the LED 50 to the light inhibiting part 64 is 2 mm and the distance from the light inhibiting part 64 to the condensing point is 1.8 cm.

Additionally, the light inhibiting part 64 may be various optical elements, such as a light absorber, a reflector, a diffuser, a deflecting element, and a diffraction grating. FIGS. 7A to 7F are typical views showing a specific example of the light inhibiting part. In the example shown in FIG. 7A, the light inhibiting part 64A is a light absorber or a reflector. The light absorber absorbs a zeroth-order light component, and intercepts or attenuates the zeroth-order light component that arrives at the surface 12A of the photoreceptor drum 12. The reflector reflects the zeroth-order light component in a direction different from the photoreceptor drum 12, and intercepts or attenuates the zeroth-order light component that arrives at the surface 12A of the photoreceptor drum 12.

Figures 7A, 7B, 7C, 7D, 7E, 7F:
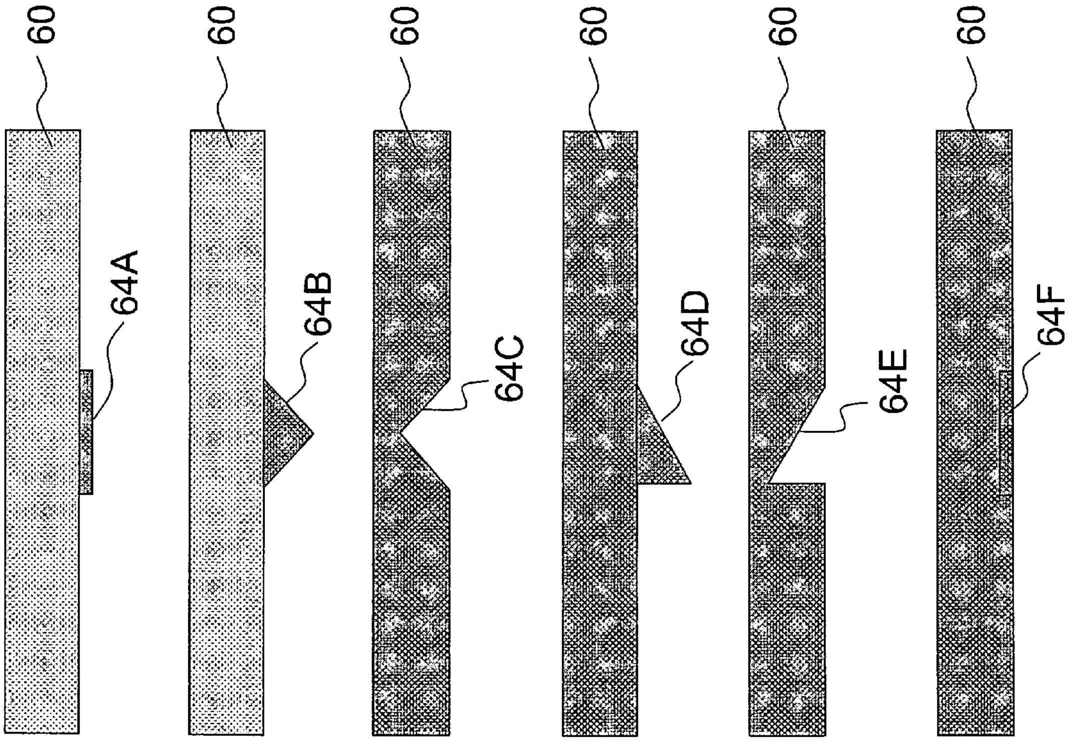
FIGS. 7A to 7F are typical views showing a specific example of the light inhibiting part.

The light absorber is made of resin containing a dye, a pigment, or the like that absorbs light of a wavelength emitted from an LED 50. The reflector is made of a metal that reflects light of a wavelength emitted from an LED 50, or an interference film obtained by laminating materials having different refractive indexes. Metals with a high reflectivity include, for example, silver (Ag), gold (Au), and the like. As shown in FIG. 7A, a light inhibiting part 64A composed of a light absorber or a reflector is formed by forming a film on the surface of an adjacent member, for example by applying a material, such as black resin, or vapor-depositing a metal.

In examples shown in FIGS. 7B to 7E, light inhibiting part 64B to a light inhibiting part 64E are a deflecting element, respectively. The deflecting element is a convex part or a concave part that deflects (refracts) light of a wavelength emitted from the LED 50 in a predetermined direction. The deflecting element deflects the zeroth-order light component in a direction different from the photoreceptor drum 12, and intercepts or attenuates the zeroth-order light component that arrives at the surface 12A of the photoreceptor drum 12. Here, although one convex part or concave part is shown, a concavo-convex structure in which plural convex parts or concave parts are periodically arranged, such as a micro prism array, may be adopted. The concavo-convex structure where plural convex parts or concave parts are periodically arranged functions as a deflecting element similarly to one convex part or concave part.

In examples shown in FIGS. 7B and 7D, the light inhibiting part 64B and the light inhibiting part 64D are convex prisms including two slopes. The two slopes of the light inhibiting part 64B are inclined in different directions at the same angle with respect to the normal direction of the LED substrate 58. The two slopes of the light inhibiting part 64D are inclined in different directions at different angles with respect to the normal direction of the LED substrate 58. In examples shown in FIGS. 7C and 7E, the light inhibiting part 64C and the light inhibiting part 64E are concave cutout parts including two slopes. The two slopes of the light inhibiting part 64C are inclined in different directions at the same angle with respect to the normal direction of the LED substrate 58. The two slopes of the light inhibiting part 64E are inclined in different directions at different angles with respect to the normal direction of the LED substrate 58.

The convex prism or the concave cutout part is made of an optical material that refracts light of a wavelength emitted from the LED 50. When light enters from an air space, the optical material includes glass, transparent resin, or the like whose refractive indexes is higher than air. The convex prism or the concave cutout part may be provided on the surface of the hologram recording layer 60, and may be provided on the surface of a protective layer that protects the hologram recording layer 60. Additionally, when the hologram recording layer 60 is housed within a container, the convex prism or the concave cutout part may be provided as a portion of the container. The convex prism or the concave cutout part is made on the surface of the hologram recording layer 60 or the protective layer by injection molding of resin, surface machining of glass or resin, or the like.

In an example shown in FIG. 7F, the light inhibiting part 64F is a diffuser. The diffuser diffuses the zeroth-order light component in plural directions, and intercepts or attenuates the zeroth-order light component that arrives at the surface 12A of the photoreceptor drum 12. The diffuser is made of a diffusion plate that diffuses light of a wavelength emitted from the LED 50. The diffuser has a minute concavo-convex structure in which plural concave parts or plural concave parts are irregularly arranged. Accordingly, transmitted light that is transmitted through a minute concavo-convex surface, and reflected light that is reflected by the minute concavo-convex surface becomes diffused light that is scattered in respective directions without having regular characteristics.

As shown in FIG. 7F, a light inhibiting part 64F composed of a diffuser may be adopted by forming a minute concavo-convex structure on the surface of the hologram recording layer 60. The minute concavo-convex structure may be provided on the surface of the protective layer that protects the hologram recording layer 60, or may be provided as a portion of the container when the hologram recording layer 60 is housed within the container. The minute concave-convex structure is formed by roughening the surface of the hologram recording layer 60 or the like. A related-art well-known surface-roughening, such as sandblasting, may be used for the roughening of the surface.

Second Exemplary Embodiment

LED Print Head

Figure 8:
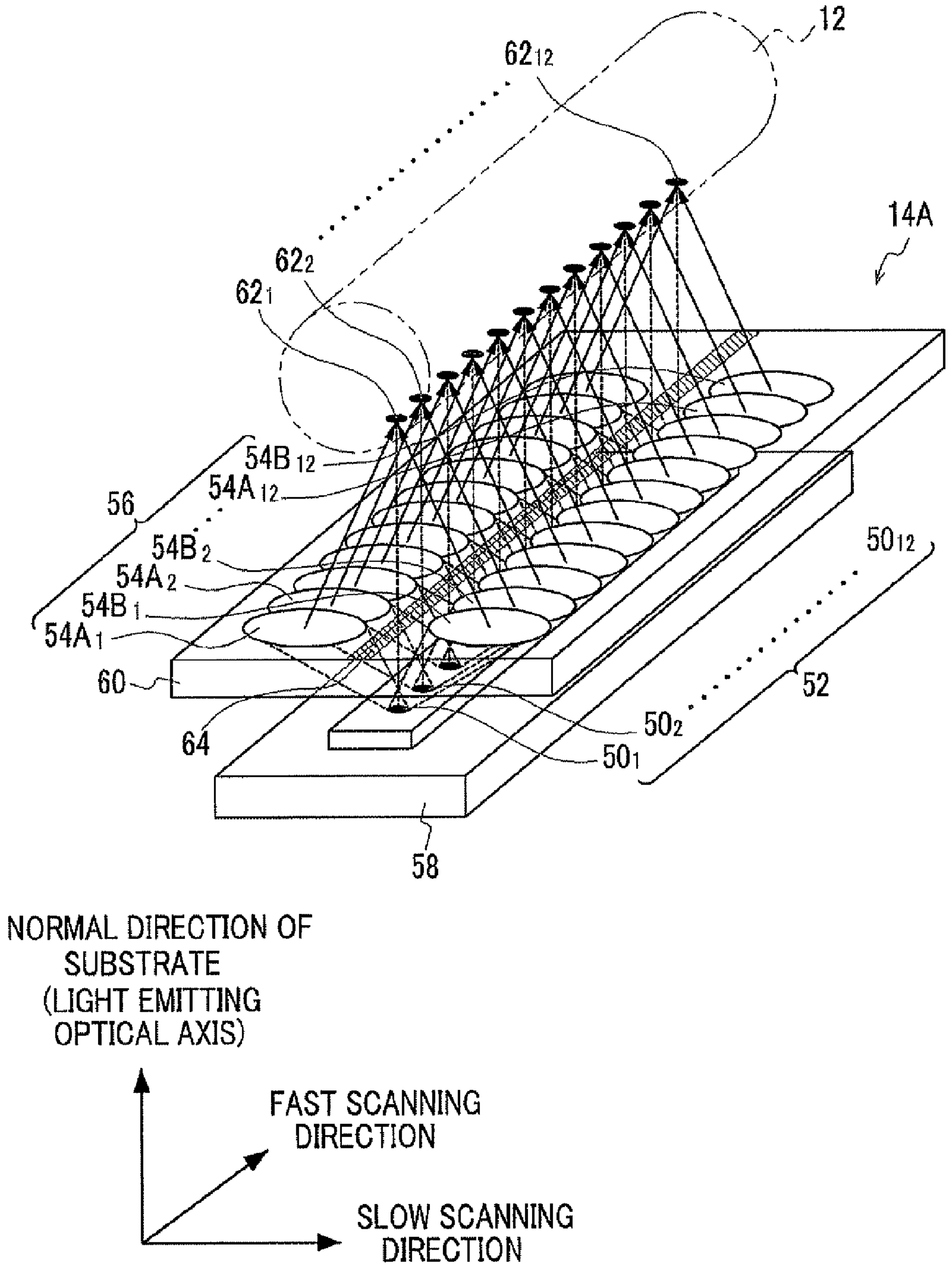
FIG. 8 is a schematic perspective view showing an example of the configuration of an LED print head serving as an exposure device related to a second exemplary embodiment of the invention.
Figure 9:
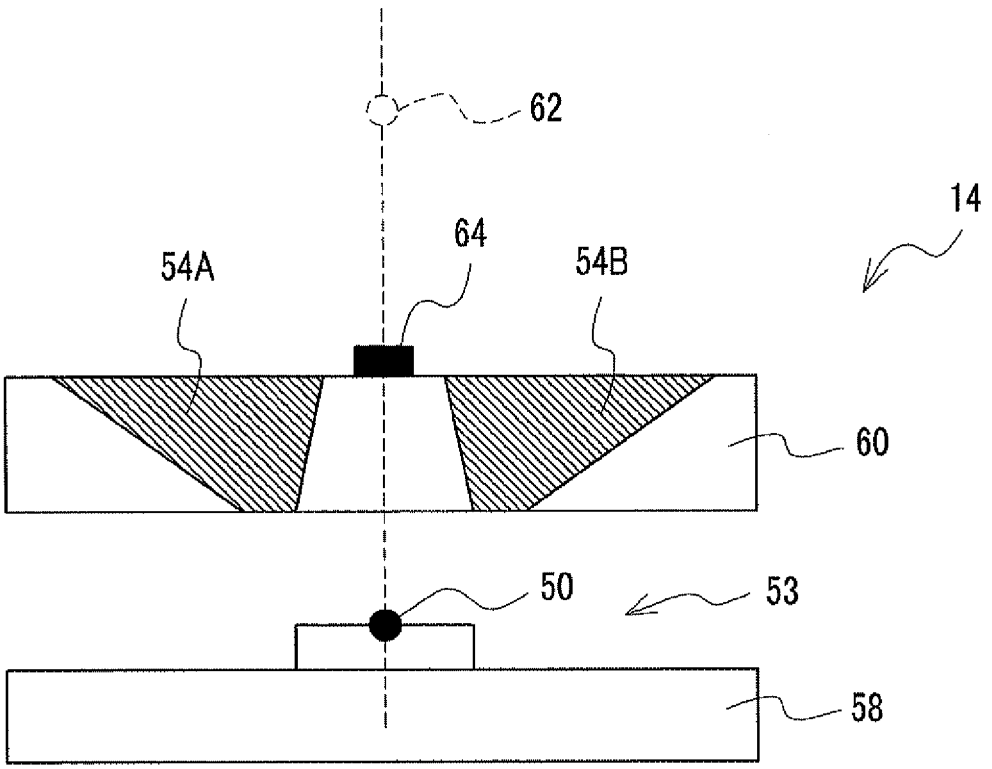
FIG. 9 is a cross-sectional view of the LED print head related to the second exemplary embodiment in a slow scanning direction.

FIG. 8 is a schematic perspective view showing an example of the configuration of an LED print head serving as an exposure device related to a second exemplary embodiment of the invention. FIG. 9 is a cross-sectional view of the LED print head in a slow scanning direction. Since this LED print head has the same configuration as the LED print head related to the first exemplary embodiment except that two hologram element 54A and hologram element 54B corresponding to one LED 50 are formed, and the light inhibiting part 64 is arranged on the light emission side of the hologram recording layer 60, the same components are designated by the same reference numerals, and the description thereof is omitted.

As shown in FIG. 8, an LPH 14A is equipped with the LED array 52 and the hologram element array 56. The LED array 52 is equipped with twelve LEDs $\mathbf{50}_1$ to $\mathbf{50}_{12}$. The hologram element array 56 is equipped with twelve hologram elements $\mathbf{54}A_1$ to $\mathbf{54}A_{12}$ and twelve hologram elements $\mathbf{54}B_1$ to $\mathbf{54}B_{12}$. In addition, when the LEDs and the hologram elements do not need to be distinguished, respectively, the LEDs $\mathbf{50}_1$ to $\mathbf{50}_{12}$ are generically referred to as the "LEDs 50", the hologram elements $\mathbf{54}A_1$ to $\mathbf{54}A_{12}$ are generically referred to as the "hologram elements 54A", and the hologram elements $\mathbf{54}B_1$ to $\mathbf{54}B_{12}$ are generically referred to as the "hologram elements 54B".

In the hologram recording layer 60, plural hologram elements 54A corresponding to the plural LEDs 50 are formed along the fast scanning direction, and plural hologram elements 54B corresponding to the plural LEDs are formed along the fast scanning direction. For example, the LEDs 50 and the hologram elements 54 are matched with each other such that one LED $\mathbf{50}_1$ and two hologram element $\mathbf{54}A_1$ and hologram element $\mathbf{54}B_1$ become one set, and the plural hologram elements 54A and 54B are recorded on the hologram recording layer 60.

The light inhibiting part 64, which inhibits transmission of zeroth-order light components that are not diffracted by the hologram elements 54, is arranged on the light emission side of the hologram recording layer 60. The light inhibiting part 64 is arranged on an optical path of a zeroth-order light component, i.e., a straight line that connects a light emitting point and a condensing point. In this exemplary embodiment, one belt-shaped light inhibiting part 64 that extends in the fast scanning direction is arranged so as to cover the central portion of a light emission plane of the hologram recording layer 60 in the width direction thereof. In other words, the light inhibiting part 64 is arranged between the hologram element 54A and the hologram element 54B so as to avoid the hologram elements 54A and 54B such that the light diffracted by the hologram elements 54A and 54B passes both sides of the light inhibiting part 64.

In addition, although the example in which the light inhibiting part 64 is arranged on the light emission side of the hologram recording layer 60 has been described above, the light inhibiting part 64 may be arranged on the straight line that connects the light emitting point and the condensing point, similarly to the first exemplary embodiment.

(Operation of LED Print Head)

As shown in FIG. 8, in the LPH 14A related to the second exemplary embodiment, the light components emitted from the LEDs 50, respectively, have zeroth-order light components intercepted or attenuated by the light inhibiting part 64, and enter the corresponding hologram elements 54A and 54B. The hologram elements 54A and 54B diffract the light components that have entered, thereby generating diffraction light components. Each diffraction light beam generated in each of the hologram elements 54A and 54B is emitted toward the photoreceptor drum 12.

The photoreceptor drum 12 is arranged so as to face the LPH 14A. The respective diffraction light components that have been emitted from the LPH 14A are condensed in the direction of the photoreceptor drum 12, thereby forming an image on the surface of the photoreceptor drum 12 arranged at a focal plane several centimeters ahead. That is, each of the plural hologram elements 54 diffracts and condenses the light emitted from the corresponding LED 50, and forms an image on the surface of the photoreceptor drum 12.

Minute spots $\mathbf{62}_1$ to $\mathbf{62}_{12}$ caused by the respective diffraction light components are formed in correspondence with to the LEDs $\mathbf{50}_1$ to $\mathbf{50}_{12}$, respectively, on the surface of the photoreceptor drum 12 so as to be arranged in one row in the fast scanning direction. For example, the light emitted from one LED $\mathbf{50}_1$ is diffracted and condensed by the corresponding hologram element $\mathbf{54}A_1$ and $\mathbf{54}B_1$ to form one spot $\mathbf{62}_1$. In addition, when the spots do not need to be distinguished, respectively, the spots $\mathbf{62}_1$ to $\mathbf{62}_{12}$ are generically referred to as "spots 62".

In this exemplary embodiment, similarly to the first exemplary embodiment, signal light is reproduced with high precision and clear minute spots 62 (condensing points) of an outline are formed, due to the high condensing performance of the hologram elements 54A and 54B, and the reduction of the unnecessary light by the light inhibiting part 64.

(Method for Fabricating LED Print Head)

Figure 10A:
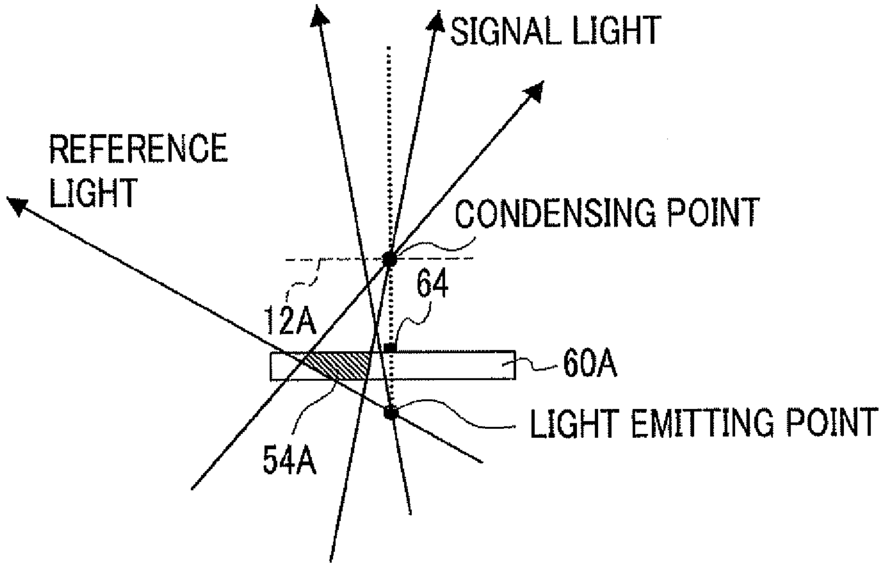
FIGS. 10A and 10B are typical cross-sectional views showing that a hologram is recorded in the second exemplary embodiment.
Figure 10B:
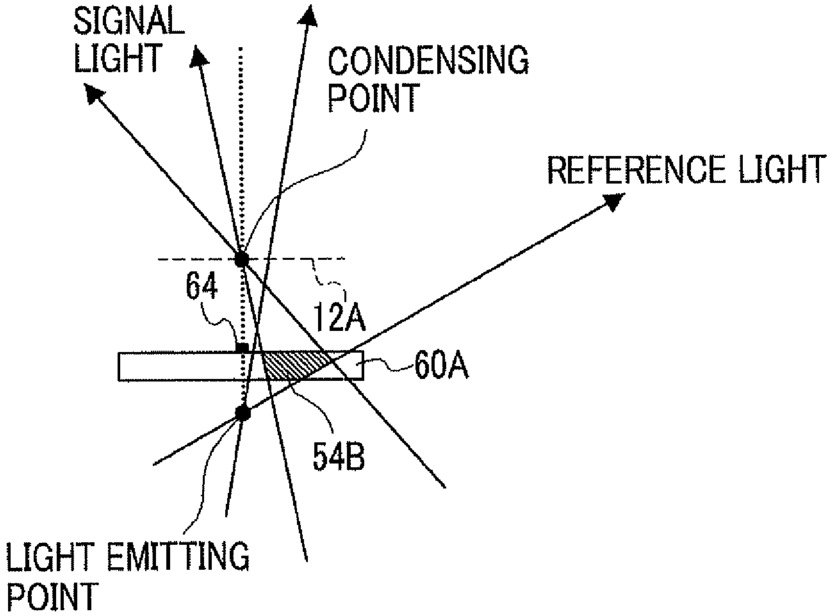

Next, a method for fabricating an LED print head will be described. FIGS. 10A and 10B are typical cross-sectional views showing that a hologram is recorded in the second exemplary embodiment, i.e., that hologram elements 54A and 54B are formed in the hologram recording layer 60A before a hologram is recorded. Illustration of the photoreceptor drum 12 is omitted, and only the surface 12A that is an imaging surface is shown.

As shown in FIG. 10A, when the hologram element 54A is recorded, coherent light that passes through the outside (the left in the drawing) of the light inhibiting part 64, and passes through an optical path of diffraction light that forms a condensing point on the surface 12A is irradiated to the hologram recording layer 60A as signal light. Simultaneously, when passing through the hologram recording layer 60A, coherent light that passes through an optical path of diffused light that is diffused from the light emitting point to the hologram diameter $r_H$ of the hologram element 54A is irradiated to the hologram recording layer 60A as reference light. This reference light also passes through the outside (the left in the drawing) of the light inhibiting part 64. In addition, a laser light source, such as a semiconductor laser, is used for the irradiation of the coherent light.

Additionally, as shown in FIG. 10B, when the hologram element 54B is recorded, coherent light that passes through the outside (the right in the drawing) of the light inhibiting part 64, and passes through an optical path of diffraction light that forms a condensing point on the surface 12A is irradiated to the hologram recording layer 60A as signal light. Simultaneously, when passing through the hologram recording layer 60A, coherent light that passes through an optical path of diffused light that is diffused from the light emitting point to the hologram diameter $r_H$ of the hologram element 54B is irradiated to the hologram recording layer 60A as reference light. This reference light also passes through the outside (the right in the drawing) of the light inhibiting part 64.

Even when either of the hologram elements 54A and 54B is recorded, the signal light and the reference light are irradiated from the same side (side where the LED substrate 58 is arranged) as the hologram recording layer 60A. Additionally, the signal light and the reference light are irradiated such that the optical axis of the signal light and the optical axis of the reference light intersect each other. Thereby, the hologram elements 54A and 54B are recorded on the hologram recording layer 60.

Even in the LPH 14A related to the second exemplary embodiment, the condensing point is present on the normal line of the LED substrate 58 from the light emitting point. Accordingly, the straight line (shown by a dotted line) that passes through the light emitting point and the condensing point intersects the optical axis of the diffraction light. The optical axis of the diffraction light by the hologram element 54A and the optical axis of the diffraction light by the hologram element 54B intersect the above straight line at different angles. Thereby, only the unnecessary light that is emitted from a light emitting element, and arrives at a face to be exposed without being diffracted by a hologram element may be expected to be reduced.

Next, the belt-shaped light inhibiting part 64 is provided on the surface on the light emission side of the hologram recording layer 60 so as to cover the central portion of the light emission plane in the width direction thereof. For example, when the light inhibiting part 64 is composed of an optical absorber, such as black resin, the black resin is applied to a portion of the light emission plane, and thereby, the light inhibiting part 64 is formed. The LPH 14A related to the second exemplary embodiment is fabricated by attaching the hologram recording layer 60 in which the light inhibiting part 64 is provided onto the LED substrate 58 on which the LED array 52 is mounted.

Additionally, even in the second exemplary embodiment, the light inhibiting part 64 may record a hologram on the hologram recording layer 60A that is formed in advance. In this case, holograms are recorded by phase conjugation recording after the hologram recording layer 60A is attached onto the LED substrate 58 on which the LED array 52 is mounted. In the phase conjugation recording, the signal light and reference light that pass through the same optical paths as above are irradiated from the side where the LED substrate 58 or the like is not arranged, i.e., from the surface side (the upper side of the drawing) of the hologram recording layer 60A. Even in this case, the hologram recording layer 60 in which the transmissive hologram elements 54 are formed is similarly obtained.

(Hologram Recording Device)

Figure 12:
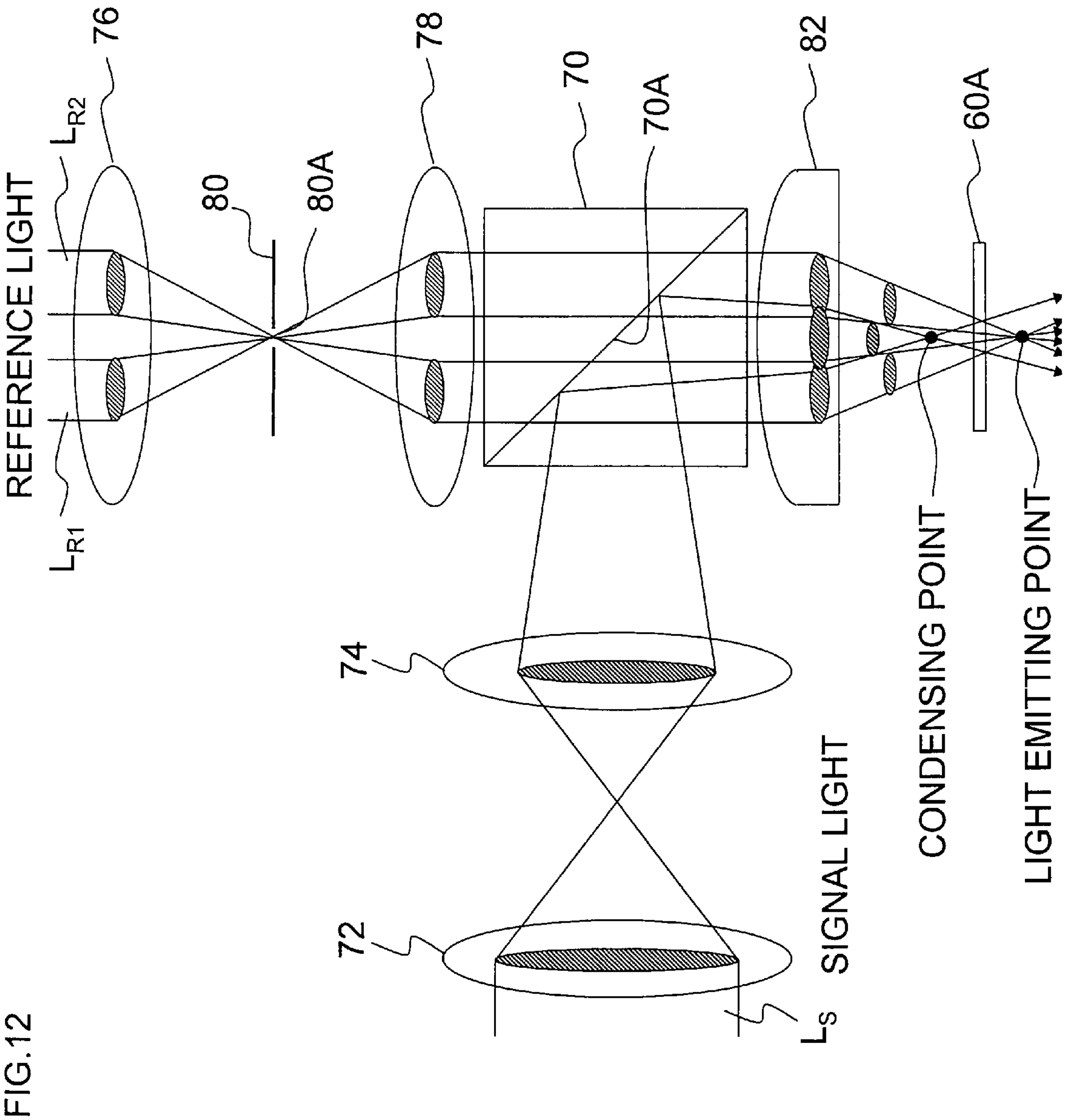
FIG. 12 is a schematic view showing an example of the configuration of a hologram recording device.

Next, a hologram recording device used for the fabrication of the LPH related to the second exemplary embodiment will be described. FIG. 12 is a schematic view showing an example of the configuration of the hologram recording device for the phase conjugation recording. As shown in FIG. 12, the hologram recording device is equipped with a beam splitter 70, and an illumination optical system 82 that irradiates the hologram recording layer 60A with recording light emitted from the beam splitter 70.

Signal light $L_S$ and reference light $L_{R1}$ and reference light $L_{R2}$ are irradiated on the hologram recording layer 60A as recording light. The beam splitter 70 is equipped with a semitransparent mirror surface 70A, reflects a portion of the signal light $L_S$ that has entered the semitransparent mirror surface 70A from the left in the drawing, and is transmitted through portions of the reference light $L_{R1}$ and reference light $L_{R2}$ that have entered the semitransparent mirror surface 70A from the upper side in the drawing. In this way, the beam splitter 70 guides the reference light and the signal light to the same lens.

A lens 72 and a lens 74 are arranged on the signal light incidence side of the beam splitter 70. The signal light $L_S$ that has entered the lens 72 is relayed by the lens 72, enters the lens 74, is condensed by the lens 74, and enters the beam splitter 70. The signal light $L_S$ that has entered the beam splitter 70 is reflected by the semitransparent mirror surface 70A, and enters a lens 82 with high NA. The signal light $L_S$ that has entered the lens 82 is condensed by the lens 82 so as to form a focus at a condensing point, and is irradiated to the hologram recording layer 60A.

A lens 76 and a lens 78 are arranged on the reference light incidence side of the beam splitter 70. A shading member 80 having an opening 80A is arranged between the lens 76 and the lens 78. The shading member 80 is arranged at a focal position of the lens 76. The opening 80A is provided at the position of a beam waist of light that is condensed by the lens 76. The reference light $L_{R1}$ and reference light $L_{R2}$ that have entered the lens 76 are condensed by the lens 76 and irradiated to the shading member 80. Portions of the reference light $L_{R1}$ and reference light $L_{R2}$ that have been irradiated to the shading member 80 pass through the opening 80A, and enter the lens 78.

The reference light $L_{R1}$ and reference light $L_{R2}$ that have entered the lens 78 are collimated by the lens 78, and enters the beam splitter 70. The reference light $L_{R1}$ and reference light $L_{R2}$ that have entered the beam splitter 70 are transmitted through the semitransparent mirror surface 70A, and enter a lens 82. The reference light $L_{R1}$ and reference light $L_{R2}$ that have entered the lens 82 are condensed by the lens 82 so as to condense on a light emitting point, and are irradiated to the hologram recording layer 60A simultaneously with the signal light $L_S$. Thereby, two hologram elements corresponding to one LED are formed similarly to the LPH 14A of the second exemplary embodiment.

In addition, in order to form a focus at the position of the light emitting point, the lens 78 is configured so as to move in a condensing direction and in its orthogonal planar direction. By adjusting the light from the light emitting point so as to pass through the opening 80A, optical path adjustment of the reference light $L_{R1}$ and the reference light $L_{R2}$ may be performed according to the variation of the light emitting point. Additionally, the reference light $L_{R1}$ and reference light $L_{R2}$ that enter the lens 76 are substantially circular in a cross-section orthogonal to an optical axis. However, from the balance between improvement in light use efficiency, and multiplicity, the shape concerned may be appropriately changed, for example, by arranging a mask or the like on the upstream side of the lens 76.

(Exposure Method using LED Print Head)

Figure 11A:
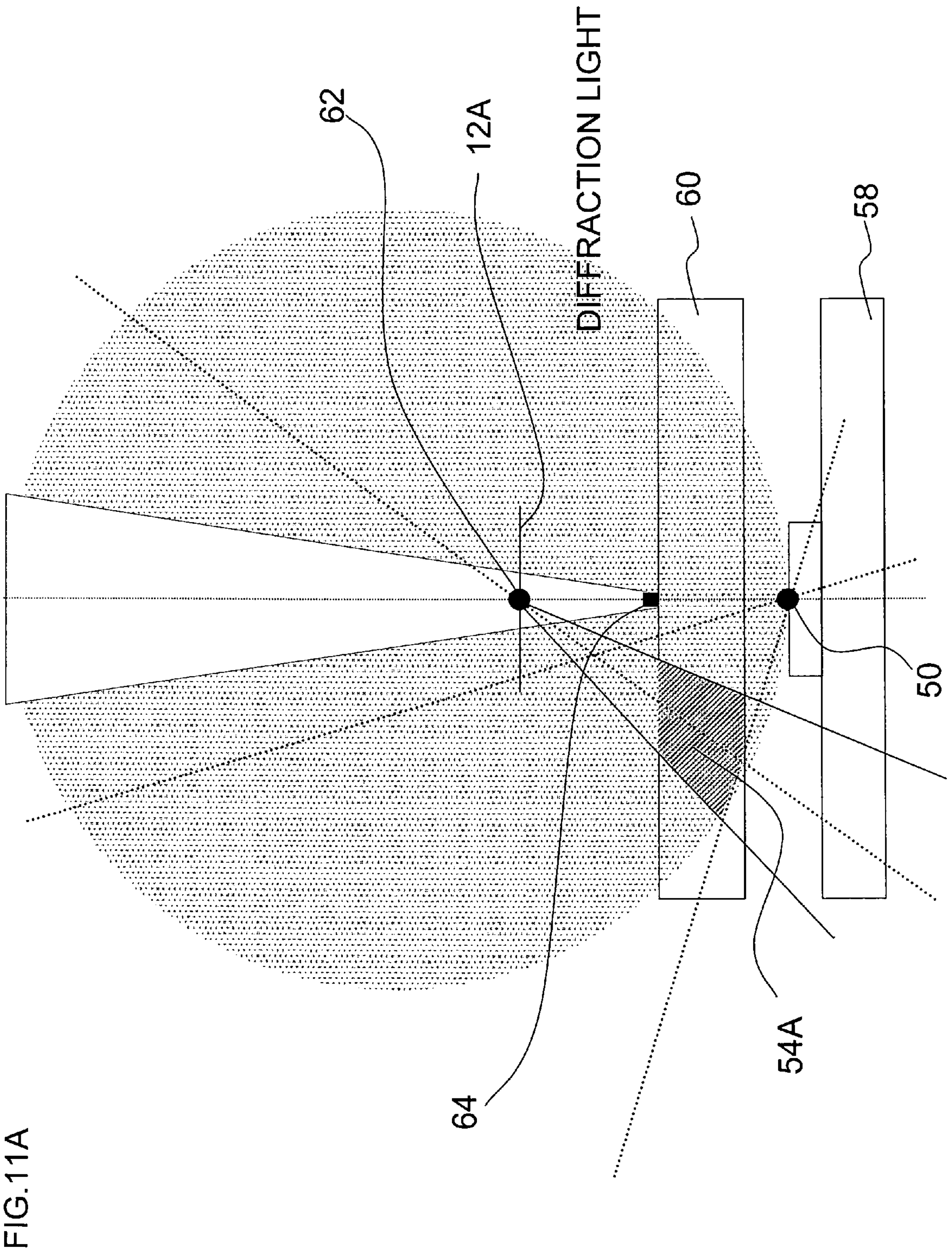
FIGS. 11A and 11B are typical cross-sectional views showing that holograms are reproduced in the second exemplary embodiment.
Figure 11B:
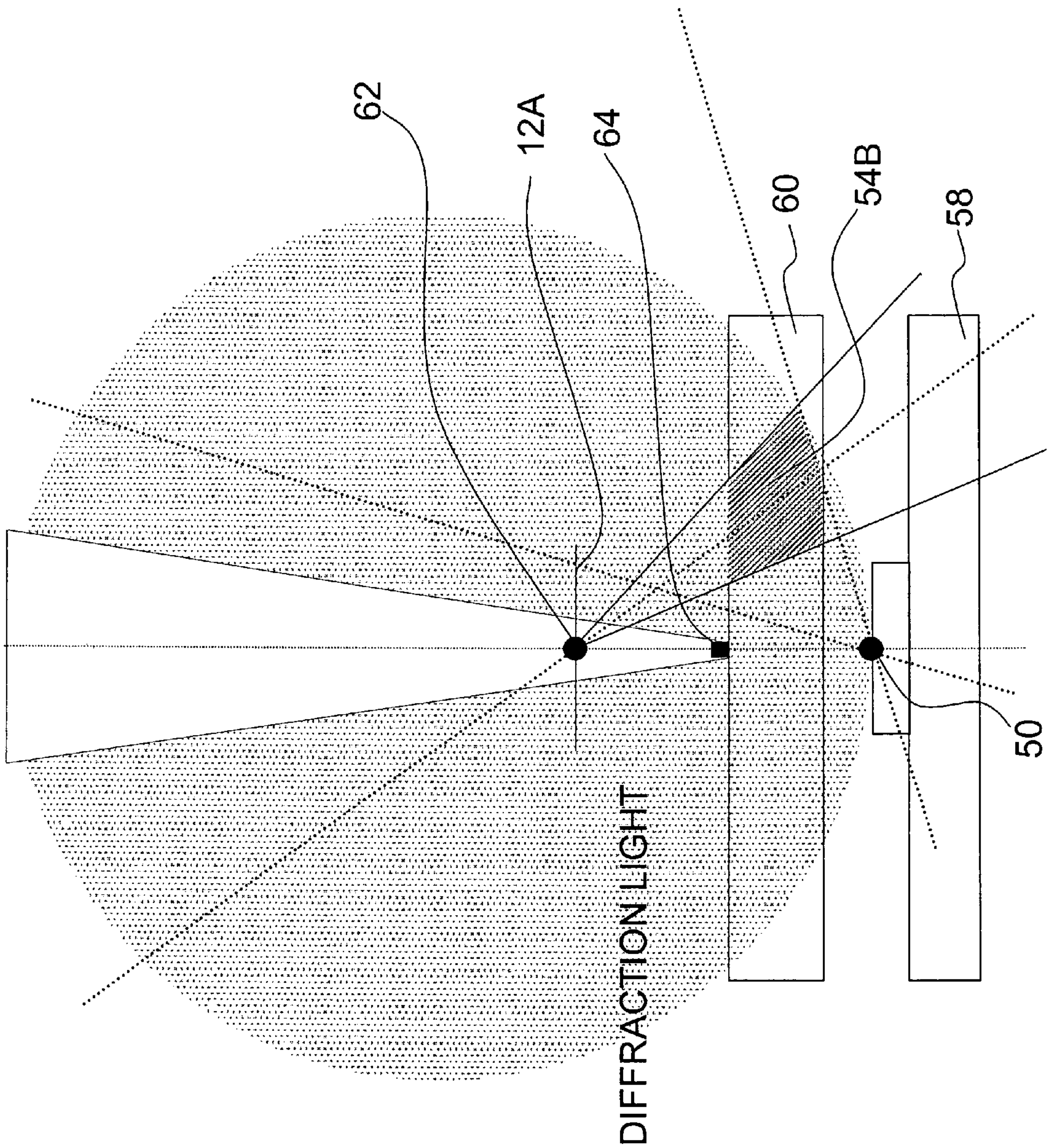

Next, an exposure method using the LED print head will be described. FIGS. 11A and 11B are typical cross-sectional views showing that holograms are reproduced, i.e., that diffraction light is taken out from the hologram elements 54A and 54B recorded on the hologram recording layer 60.

As shown in FIGS. 11A and 11B, when an LED 50 is made to emit light, a portion of the light emitted from the LED 50 passes through an optical path of reference light that has recorded each of the hologram elements 54A and 54B. This brings about almost the same situation where reference light for reproduction is irradiated to the hologram elements 54A and 54B. Diffraction light is emitted from each of the hologram elements 54A and 54B as shown by a solid line by the irradiation of the reference light for reproduction shown by a dotted line. The respectively emitted diffraction light beams pass through the outside of the light inhibiting part 64 and condense, and thereby, a spot 62 is formed on the surface 12A of the photoreceptor drum 12.

On the other hand, a portion (that is, zeroth-order light component) of light emitted from the LED 50 goes straight toward the condensing point from the light emitting point, without entering the hologram elements 54A and 54B. The zeroth-order light component that has been emitted from LEDs 50 and has passed through the hologram recording layer 60 is intercepted or decreased by the light inhibiting part 64 arranged on the optical path of the zeroth-order light component. Accordingly, the zeroth-order light component that arrives at the surface 12A of the photoreceptor drum 12 is reduced.

(Other Arrangement Forms of Hologram Recording Layer)

Figure 13A:
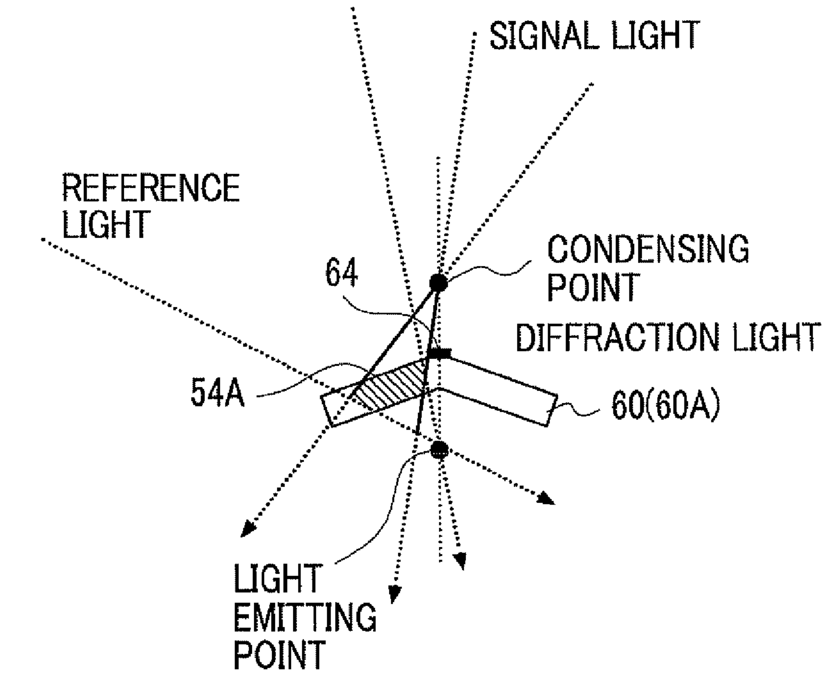
FIGS. 13A and 13B are typical cross-sectional views showing the configuration of a modification of the LED print head related to the second exemplary embodiment.
Figure 13B:
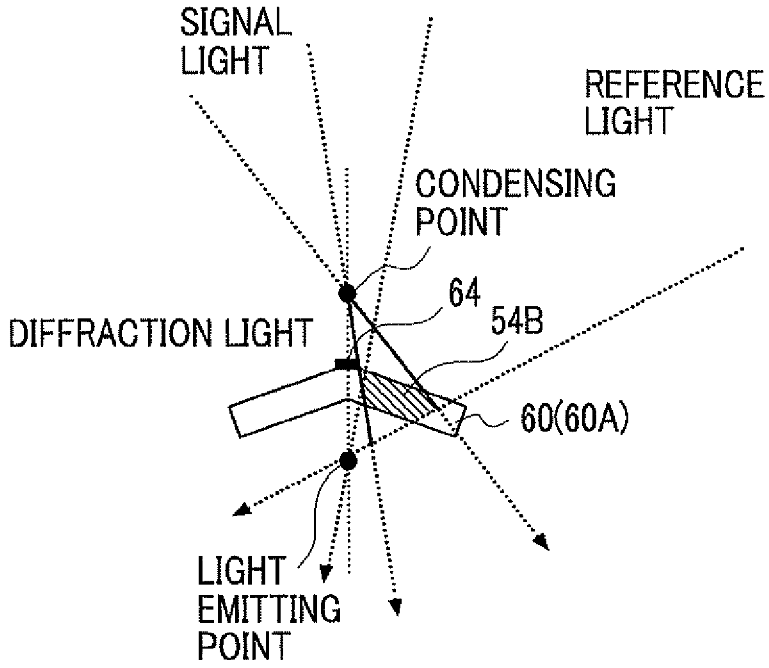
Figure 14A:
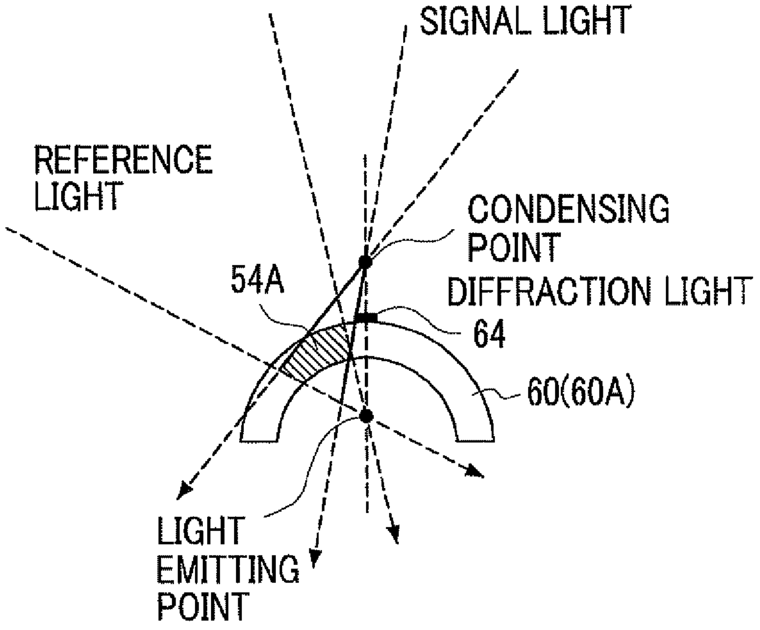
FIGS. 14A and 14B are typical cross-sectional views showing the configuration of another modification of the LED print head related to the second exemplary embodiment.
Figure 14B:
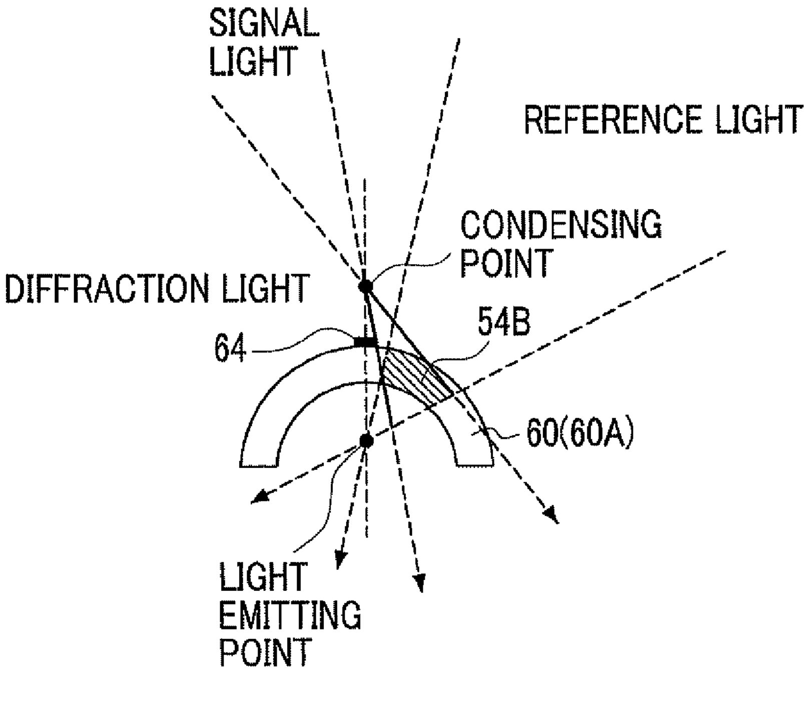

Next, modifications in which the arrangement forms of the hologram recording layer are different will be described. FIGS. 13A and 13B are typical cross-sectional views showing the configuration of a modification of the LPH related to the second exemplary embodiment. FIGS. 14A and 14B are typical cross-sectional views showing the configuration of another modification of the LPH related to the second exemplary embodiment.

As described above, in the second exemplary embodiment, each of the hologram elements 54A and 54B is recorded by the signal light and reference light that pass through the outside of the light inhibiting part 64, and the diffraction light of each of the hologram elements 54A and 54B passes through the outside of the light inhibiting part 64, and is condensed. That is, the light inhibiting part 64 is arranged so as to avoid the optical paths of the signal light and reference light.

As shown in FIGS. 13A and 13B and FIGS. 14A and 14B, a structure in which the light inhibiting part 64 is arranged at the central portion of the hologram recording layer 60 in the width direction thereof, and the hologram recording layer 60 is bent at the central portion in the width direction may be used. In the hologram recording layer 60, the central portion in the width direction may be folded two times so as to become a ridge as shown in FIGS. 13A and 13B, or the central portion in the width direction may be curved toward the center as shown in FIGS. 14A and 14B.

On both sides of the light inhibiting part 64, the hologram recording layer 60 is bent so as to approach the light emitting point. The reference light passes through an optical path of diffused light that is diffused to the hologram diameter $r_H$ of the hologram element 54A or 54B from the light emitting point. Accordingly, since the hologram recording layer 60A before recording is bent, the angle of incidence of the reference light to the hologram recording layer 60A becomes shallow (small). In other words, compared with a case where the hologram recording layer is not bent, a larger hologram is recorded, and the light use efficiency is also improved.

Other Modifications

In addition, although the example equipped with the LED print head equipped with the plural LEDs has been described above, other light emitting elements, such as organic electroluminescent elements (OEL) and laser diodes (LD) may be used instead of the LEDs. Even in a case where the hologram elements are designed according to the characteristics of the light emitting elements, and the unnecessary exposure caused by the incoherent light is reduced to thereby use the LEDs or OELs that emit incoherent light as the light emitting elements, minute spots with clear outlines are formed similarly to a case where the LDs that emit coherent light are used as the light emitting elements.

Additionally, a method of performing multiplexing recording of plural hologram elements is not particularly limited if the system is a multiplexing system in which desired diffraction light is obtained. Additionally, plural kinds of multiplexing systems may be combined. The multiplexing systems include spherical wave shift multiplexing recording, angle multiplexing recording that performs recording while changing the incident angle of reference light, wavelength multiplexing recording that performs recording while changing the wavelength of reference light, and phase multiplexing recording that performs recording while changing the phase of reference light. In addition, each of the plural hologram elements may be recorded with the same wavelength, and may be recorded by combining plural wavelengths (wavelength multiplexing).

Additionally, although the image forming apparatus that is a tandem digital color printer, and the LED print head serving as an exposure device that exposes the photoreceptor drum of each image forming unit have been described in the above, an image forming apparatus in which an image is formed by performing imagewise exposure of a photosensitive image recording medium by an exposure device may be used. The invention is not limited to the above application example. For example, the image forming apparatus is not limited to the digital color printer of an electrophotographic system. The exposure device of the invention may be mounted on writing apparatuses, such as an image forming apparatus of a silver salt system and optical writing type electronic paper. Additionally, the photosensitive image recording medium is not limited to the photoreceptor drum. The exposure device related to the above application may also be applied to exposure of a sheet-like photoreceptor or photosensitive material, a photoresist, a photopolymer, and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An exposure device comprising:

at least one light emitting element that is arranged on a substrate to emit light in a normal direction of the substrate;

at least one hologram element that is recorded on a recording layer arranged on the substrate so as to form a set with each of the light emitting elements and that diffracts light emitted from the light emitting element, and condenses the diffracted light on a condensing point that is present on a normal line of the light emitting element and on a face to be exposed; and at least one light inhibiting part that is provided at the set and is arranged on a straight line that connects the light emitting element and the condensing point such that the light diffracted by the hologram element passes through the outside of the light inhibiting part and condenses at the condensing point, to inhibit transmission of zeroth-order light that goes straight toward the condensing point from the light emitting element without being diffracted by the hologram element.

2. The exposure device according to claim 1, wherein the light inhibiting part intercepts or attenuates incident light to inhibit transmission of the zeroth-order light.

3. The exposure device according to claim 2, wherein the light inhibiting part is arranged adjacent to a light incidence side or a light emission side of the recording layer.

4. The exposure device according to claim 3, wherein the hologram is recorded such that an optical axis of diffraction light becomes parallel to a straight line that connects the light emitting element and the condensing point.

5. The exposure device according to claim 3, wherein the hologram element is recorded such that an optical axis of diffraction light intersects a straight line that connects the light emitting element and the condensing point.

6. The exposure device according to claim 5, wherein the set is constituted by one light emitting element and a plurality of holograms, and a plurality of optical axes of diffraction light diffracted from the plurality of holograms, respectively, intersect a straight line that connects the light emitting element and the condensing point at the condensing point.

7. The exposure device according to claim 2, wherein the hologram element is recorded such that an optical axis of diffraction light becomes parallel to a straight line that connects the light emitting element and the condensing point.

8. The exposure device according to claim 2, wherein the hologram element is recorded such that an optical axis of diffraction light intersects a straight line that connects the light emitting element and the condensing point.

9. The exposure device according to claim 8, wherein the set is constituted by one light emitting element and a plurality of holograms, and a plurality of optical axes of diffraction light diffracted from the plurality of holograms, respectively, intersect a straight line that connects the light emitting element and the condensing point at the condensing point.

10. The exposure device according to claim 1, wherein the light inhibiting part is arranged adjacent to a light incidence side or a light emission side of the recording layer.

11. The exposure device according to claim 10, wherein the hologram element is recorded such that an optical axis of diffraction light becomes parallel to a straight line that connects the light emitting element and the condensing point.

12. The exposure device according to claim 10, wherein the hologram element is recorded such that an optical axis of diffraction light intersects a straight line that connects the light emitting element and the condensing point.

13. The exposure device according to claim 12, wherein the set is constituted by one light emitting element and a plurality of holograms, and a plurality of optical axes of diffraction light diffracted from the plurality of holograms, respectively, intersect a straight line that connects the light emitting element and the condensing point at the condensing point.

14. The exposure device according to claim 1, wherein the hologram element is recorded such that an optical axis of diffraction light becomes parallel to a straight line that connects the light emitting element and the condensing point.

15. The exposure device according to claim 1, wherein the hologram element is recorded such that an optical axis of diffraction light intersects a straight line that connects the light emitting element and the condensing point.

16. The exposure device according to claim 15, wherein the set is constituted by one light emitting element and a plurality of holograms, and a plurality of optical axes of diffraction light diffracted from the plurality of holograms, respectively, intersect a straight line that connects the light emitting element and the condensing point at the condensing point.

17. The exposure device according to claim 15, wherein the recording layer is arranged to incline with respect to the substrate.

18. The exposure device according to claim 1, wherein the light inhibiting part is a light absorber that absorbs incident light, a reflector that reflects incident light, a diffuser that diffuses incident light in a plurality of directions, a deflecting element that deflects incident light in a predetermined direction, or a diffraction grating that diffracts incident light in a predetermined direction.

19. An image forming apparatus comprising:

the exposure device according to claim 1; and a photoreceptor arranged so as to be separated from the exposure device by an operating distance, moved in a second direction intersecting the first direction relative to the exposure device, and subjected to scanning and exposure according to image data by the exposure device such that an image is written therein.

20. An exposure device comprising:

a substrate on which a plurality of light emitting elements that emit light in a normal direction of a substrate and that are arranged so as to be aligned in a first direction;

a recording layer that is arranged on the substrate, and that has hologram elements corresponding to the plurality of light emitting elements, respectively, wherein the hologram elements diffract light emitted from each of the plurality of light emitting elements by a corresponding hologram element, and condenses the light on a condensing point that is located at an intersection between a normal line of each of the light emitting elements, and a face to be exposed; and one light inhibiting part that is provided to extend in the first direction, and that is arranged between the face to be exposed and the recording layer such that the light diffracted by each of the plurality of hologram elements passes through the outside of the light inhibiting part and condenses at the condensing point, to inhibit transmission zeroth-order light that goes straight toward the condensing point from the light emitting element without being diffracted by the corresponding hologram element.

* * * * *